(12) United States Patent
    Purkis

(10) Patent No.: US 11,161,712 B2
(45) Date of Patent: Nov. 2, 2021

(54) OPTICAL FIBRE SPOOL

(71) Applicant: Well-Sense Technology Limited, Aberdeen (GB)

(72) Inventor: Daniel George Purkis, Dyce (GB)

(73) Assignee: Well-Sense Technology Limited, Aberdeen (GB)

( * ) Notice: Subject to any disclaimer, the term of this patent is extended or adjusted under 35 U.S.C. 154(b) by 109 days.

(21) Appl. No.: 16/631,698

(22) PCT Filed: Jul. 17, 2018

(86) PCT No.: PCT/GB2018/052023
    § 371 (c)(1),
    (2) Date: Jan. 16, 2020

(87) PCT Pub. No.: WO2019/016538
    PCT Pub. Date: Jan. 24, 2019

(65) Prior Publication Data
    US 2020/0165097 A1    May 28, 2020

(30) Foreign Application Priority Data
    Jul. 18, 2017   (GB) .................................... 1711508

(51) Int. Cl.
    *B65H 55/04*   (2006.01)
    *B65H 54/10*   (2006.01)
    (Continued)

(52) U.S. Cl.
    CPC ............ *B65H 55/04* (2013.01); *B65H 54/10* (2013.01); *E21B 23/14* (2013.01); *E21B 47/01* (2013.01);
    (Continued)

(58) Field of Classification Search
    CPC ..... G02B 6/4457; G02B 6/4458; E21B 23/14; B65H 54/10; B65H 55/04; B65H 55/043; B65H 2701/32
    See application file for complete search history.

(56) References Cited

U.S. PATENT DOCUMENTS 2,205,385 A    6/1940  Abbott et al.
5,161,208 A    11/1992  Christie et al.
(Continued)

FOREIGN PATENT DOCUMENTS

CH    425572 A    11/1966
DE    69410819 T2    12/1998
(Continued)

OTHER PUBLICATIONS

International Search Report PCT/ISA/210 for International Application No. PCT/GB2018/052023 dated Oct. 10, 2018.
(Continued)

*Primary Examiner* — William E Dondero
(74) *Attorney, Agent, or Firm* — Harness, Dickey & Pierce, P.L.C.

(57) ABSTRACT

A spool of optical fibre comprises a spool axis and a length of optical fibre wound around the spool axis to form a plurality of wrap segments arranged axially along the spool axis, wherein adjacent wrap segments partially overlap in the axial direction. Each wrap segment comprises a first wrap layer wound in a first axial direction over a first axial distance, and a second wrap layer wound over the first wrap layer in a reverse second axial direction over a second axial distance greater than the first axial distance, the optical fibre extending from the second wrap layer of one wrap segment to the first wrap layer of an adjacent wrap segment. The spool may be mounted in a device such that the optical fibre can be despooled and deployed from the device.

27 Claims, 19 Drawing Sheets

(51) Int. Cl.
*G02B 6/44* (2006.01)
*E21B 47/01* (2012.01)
*E21B 23/14* (2006.01)
*E21B 47/07* (2012.01)
*E21B 17/10* (2006.01)
*E21B 47/06* (2012.01)

(52) U.S. Cl.
CPC ........ *G02B 6/4458* (2013.01); *B65H 2701/32* (2013.01); *E21B 17/1078* (2013.01); *E21B 47/06* (2013.01); *E21B 47/07* (2020.05)

(56) References Cited

U.S. PATENT DOCUMENTS

| | | |
|---|---|---|
| 5,167,382 A | 12/1992 | Rochester et al. |
| 5,221,060 A | 6/1993 | Couvillion et al. |
| 5,228,631 A | 7/1993 | Hu et al. |
| 6,532,839 B1 | 3/2003 | Kluth et al. |

FOREIGN PATENT DOCUMENTS

| | | |
|---|---|---|
| EP | 0241964 A1 | 10/1987 |
| EP | 0762445 A2 | 3/1997 |
| EP | 1013618 A1 | 6/2000 |
| FR | 1190210 A | 10/1959 |
| GB | 1569160 A | 6/1980 |
| WO | WO-2017/009671 A1 | 1/2017 |

OTHER PUBLICATIONS

Written Opinion of the International Searching Authority PCT/ISA/237 for International Application No. PCT/GB2018/052023 dated Oct. 10, 2018.
United Kingdom Search Report for GB Application No. 1711508.0 dated Nov. 23, 2017.
International Preliminary Report on Patentability dated Jan. 30, 2020, issued in corresponding International Application No. PCt/GB2018/052023.

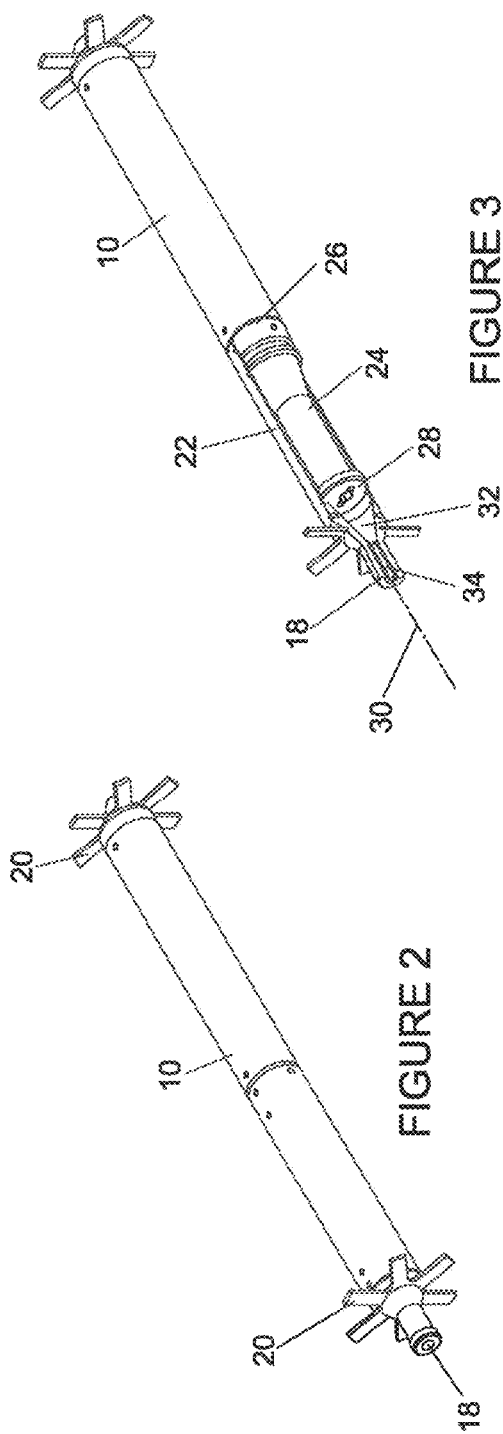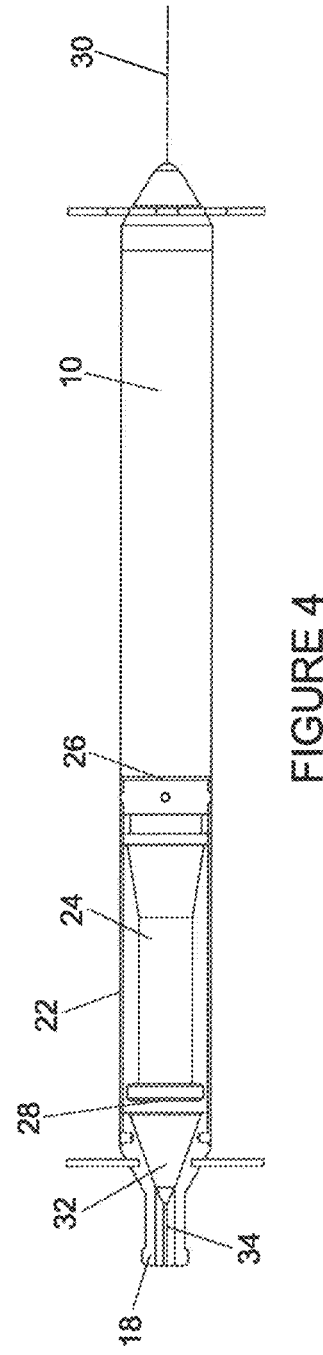

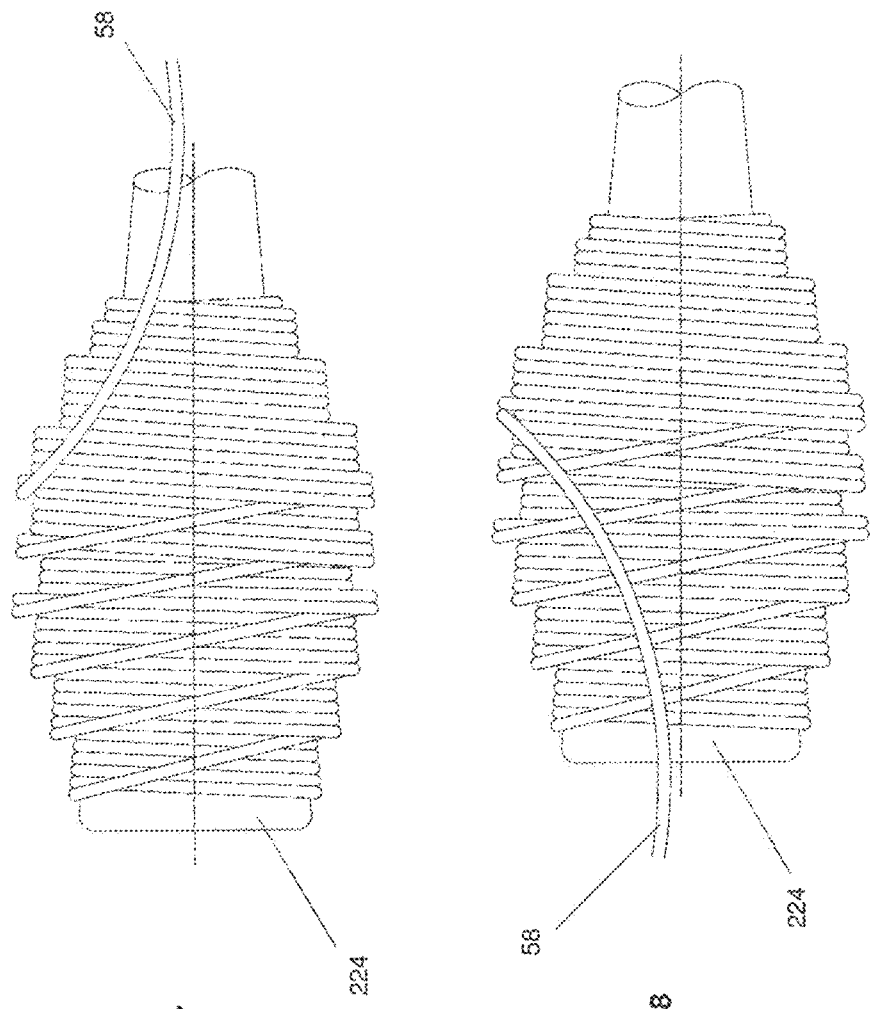

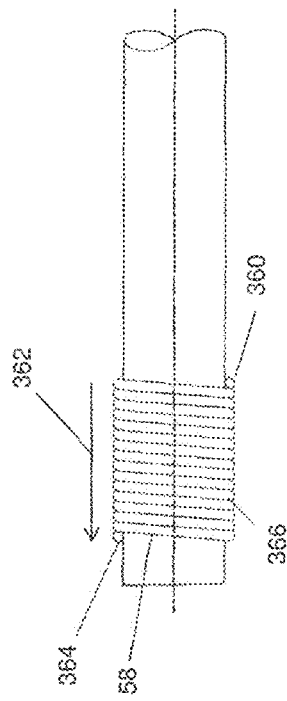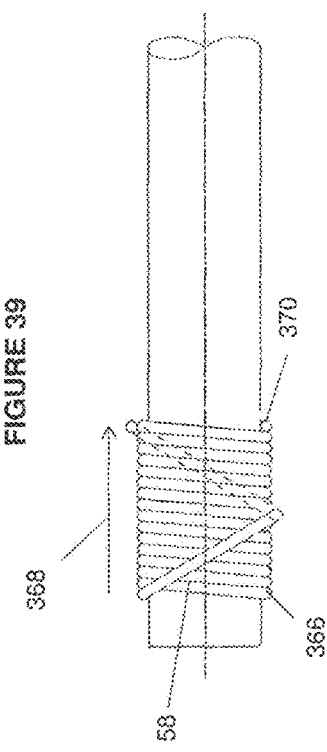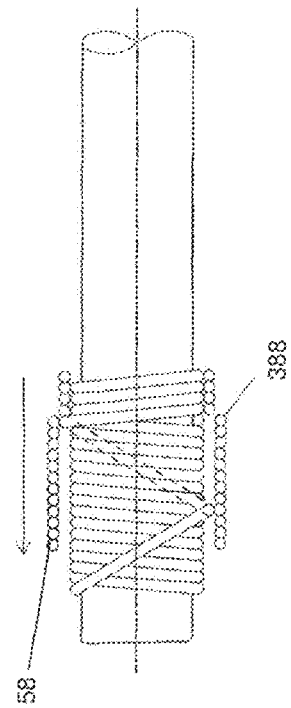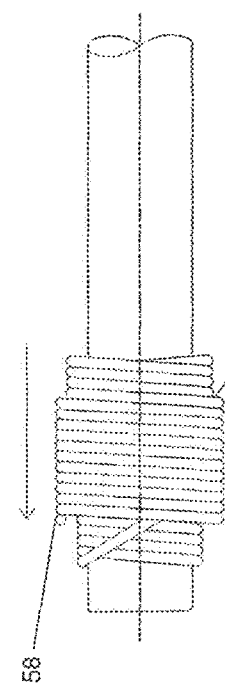

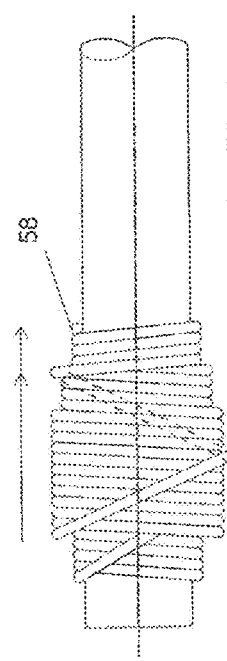
FIGURE 45
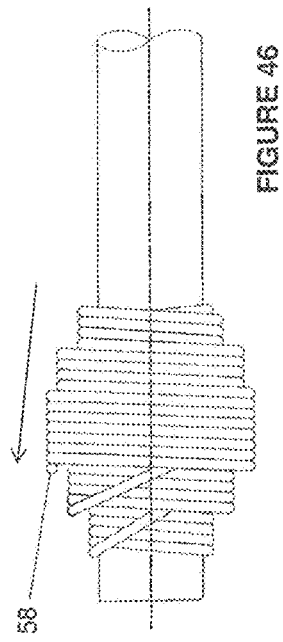
FIGURE 46
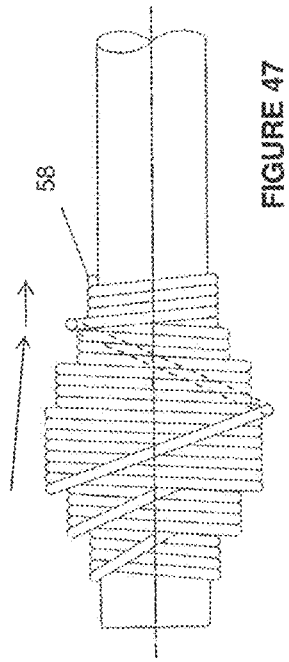
FIGURE 47
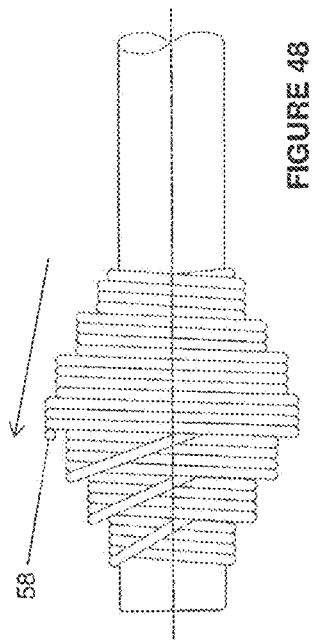
FIGURE 48
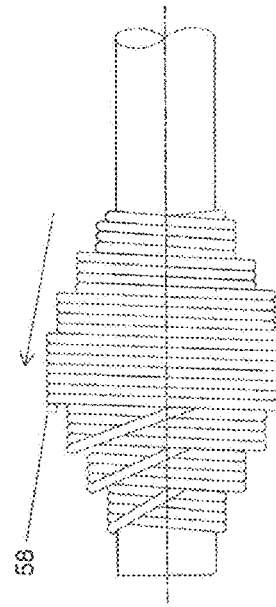
FIGURE 49
FIGURE 50

OPTICAL FIBRE SPOOL

CROSS-REFERENCE TO RELATED APPLICATIONS

This application is a national phase under 35 U.S.C. § 371 of PCT International Application No. PCT/GB2018/052023 which has an International filing date of Jul. 17, 2018, which claims priority to United Kingdom Application No. 1711508.0, filed Jul. 18, 2017, the entire contents of each of which are hereby incorporated by reference.

FIELD

The present disclosure relates to a spool of optical fibre, apparatus associated with a spool of optical fibre, and methods for winding optical fibre into a spool. The present disclosure also relates to a device which incorporates a spool of optical fibre and methods for deployment of the fibre from the device.

BACKGROUND

Optical fibres are conventionally deployed in wellbores to facilitate sensing operations, such as distributed sensing operations including distributed temperature sensing (DTS), distributed pressure sensing (DPS) and distributed acoustic sensing (DAS). Optical fibres may also be used for data communication to/from a wellbore. In many cases the optical fibre is deployed as an integral component of a completion string, and thus may be classified as a permanent installation. In many cases the costs of including a permanently installed optical fibre system can be significant, and there are also concerns over the longevity of such permanently installed systems.

The present inventor has proposed, for example in WO 2017/009671, to deploy an optical fibre from a tool or device as the tool or device traverses a wellbore, and then use the deployed optical fibre in sensing and/or communication operations. Such an arrangement may permit the optical fibre to be deployed as required, and may avoid costs and reliability concerns with permanent installations. A number of considerations are required, such as how extended lengths (e.g., from a few hundred to many thousands of meters) of optical fibre can be effectively packaged within the geometrical constraints of the associated tool. That is, as the tool must be deployed through a wellbore it may have a restricted diameter, and where significant lengths of fibre are required the fibre spool, when packaged, may by necessity have a significant axial length. Such extended lengths may be difficult to achieve, and may cause issues during despooling. In this respect, any spooling arrangement must ensure that the fibre can be, as far as possible, deployed with minimal risk of binding, bird nesting, snagging, breaking and the like.

The material properties of optical fibres may also cause issues with spooling/despooling, to such an extent that a person of skill in the art would recognise that conventional spooling techniques known for other materials such as metal wire, thread etc. may not be readily used for optical fibres, especially when smaller spooling diameters and extended spool lengths are necessary. For example, the higher flexural rigidity or axial bending stiffness of optical fibres may cause a wound fibre, especially a tightly wound fibre, to more readily seek to adopt a larger radius of curvature (i.e., an elastic recovery effect causing the fibre to "spring" or unravel radially outwardly into a larger circumference), which may result in the fibre quickly becoming tangled.

Furthermore, while comparatively strong, optical fibres may lack toughness and may be more prone to tensile failure in comparison to other spoolable material such as thread and wire, such that in the event of a snag occurring, there is a higher risk of breakage.

One conventional spool form includes winding multiple layers on a bobbin, wherein the windings in each layer traverse the entire length of the bobbin. However, for an optical fibre, there may be issues arising by the individual layers each extending the full extent of the bobbin, for example by having a large unconstrained outer layer which is susceptible to the elastic spring recovery effect. In this respect, once an outer layer initiates such an elastic recovery, underlying layers may follow suit.

Furthermore, in conventional spools a bobbin will typically have opposing axial end flanges to prevent slippage of the windings off the ends. However, there is a risk of the end winding in each layer becoming trapped or pinched against a flange, perhaps preventing the fibre from despooling or indeed breakage of the fibre.

Also, within the context of despooling fibre from a device traversing a wellbore, one possible arrangement is for the fibre to launch from the spool/device generally parallel to a winding axis of the spool. In such an arrangement there may be issues of the despooled portion of the fibre dragging across and disturbing the entire length of the underlying and unconstrained windings.

SUMMARY

An aspect of the present disclosure relates to a spool of optical fibre for mounting in a device such that the optical fibre can be despooled and deployed from the device, the spool comprising:
a spool axis;
a length of optical fibre wound around the spool axis to form a plurality of wrap segments arranged axially along the spool axis, wherein adjacent wrap segments partially overlap in the axial direction,
wherein each wrap segment comprises a first wrap layer wound in a first axial direction over a first axial distance, and a second wrap layer wound over the first wrap layer in a reverse second axial direction over a second axial distance greater than the first axial distance, the optical fibre extending from the second wrap layer of one wrap segment to the first wrap layer of an adjacent wrap segment.

Accordingly, the spool comprises an axial array of partially overlapping wrap segments each extending along only a portion of the axial length of the spool. In this respect, the total axial length of the spool may be dictated by the number of wrap segments arranged along the spool axis and the degree of overlap provided between each adjacent segment.

The first wrap layer of one wrap segment may extend in the first axial direction and over the second wrap layer of a preceding wrap segment.

During despooling of the optical fibre the wrap layers of one segment are unwound before being unwound from an adjacent wrap segment, and so on. In this way, during despooling the wrap segments are each sequentially depleted, one after the other, in an axial direction, which may be referenced as the depleting direction, along the spool axis. In this respect, during despooling, the axial length of the spool will reduce in the depleting direction. This contrasts with conventional spool arrangements in which despooling does not affect the axial spool length (at least until the final layer is reached), with the diameter instead reducing as individual layers are depleted.

The axial fleeting movement or traverse made by a launch or release point of the optical fibre during despooling from an individual wrap layer is limited to the axial length of each individual wrap segment, and not, as conventionally known, the entire axial length of the spool, which may otherwise cause complications, such as from the unwound section of fibre effectively dragging across and possibly disturbing the windings still on the spool.

Furthermore, the provision of partially overlapping wrap segments may be such that at least a proportion of one wrap segment is supported or constrained by the overlapping adjacent segment. Where more than two wrap segments are provided, an intermediate wrap segment may partially overlap an adjacent wrap segment located on one axial side, and be partially overlapped by an adjacent wrap segment on the opposite axial side. In this way the intermediate wrap segment may firstly provide circumferential support to the underlying portion of the adjacent wrap segment on one side, while being supported by the overlying portion of the adjacent wrap segment on the opposite side. Where the axial overlap is such that there may be axial overlap of one wrap segment with multiple adjacent wrap segments, the supporting effect may be enhanced.

When multiple, for example more than 3, more than 5, more than 10, more than 15, more than 30, more than 50, more than 100, more than 150 etc., wrap segments are provided, the supporting effect by the multiple overlapping adjacent wrap segments may be such as to provide a robust spool which is resistant to portions becoming prematurely unraveled, or the like. Further, the multiple adjacent and overlapping segments may provide a degree of resistance to being disturbed by any object, such as the despooled portion of the fibre, dragging thereacross. Also, the supporting effect of the overlapping segments may be such that any requirement for end flanges may be minimised or eliminated.

In some examples the optical fibre may, in use, be deployed from the spool to extend in a direction generally parallel to the spool axis. The winding arrangement of the spool may provide benefits in this regard, for example by better accommodating any dragging of the despooled fibre portion across the spool, or minimising the length of the spool which may be subject to interference by the despooled portion. In some examples the deployed optical fibre may extend generally parallel and laterally offset from the spool axis. In some examples the deployed optical fibre may extend generally coaxial with the spool axis.

In some examples the optical fibre may, in use, be despooled and deployed in the depletion direction of the wrap segments. Alternatively, the optical fibre may, in use, be despooled and deployed in the direction opposite to the depletion direction of the wrap segments. In this example any dragging of the despooled portion across the remaining fibre wraps may be minimised.

The direction in which the optical fibre is deployed, for example axially deployed, from the spool may be in accordance with user preference, operational requirements and the like. In some examples a preferred direction of deployment may be determined by the axial length of the spool. For example, for relatively long spools, there may be a preference to deploy the fibre in a direction opposite to the depletion direction of the wrap segments. In this way the deployed fibre may only ever pass or drag across a single wrap segment, i.e., the immediate segment form which the fibre is being deployed. In examples where a shorter spool is provided, it may be more acceptable to deploy the fibre in the depletion direction of the wrap segments. While the deployed fibre might drag across the multiple wrap segments, the nature and robustness of the winding arrangement may be such that this is acceptable.

One or more, for example each, wrap segment may comprise one or more wrap layers in addition to the first and second wrap layers. However, in some examples one or more, for example each, wrap segment may comprise only the first and second wrap layers.

As noted above the second wrap layer extends over the second axial distance which is greater than the first axial distance of the first wrap layer. The additional axial distance covered by the second wrap layer in each wrap segment may facilitate or provide a desired axial spacing of the adjacent wrap segment. In some examples the portion of the second wrap layer which extends axially beyond the first wrap layer may function to provide support, for example axial support, to the first wrap layer. This may restrict or minimise axial slippage or otherwise of the first wrap layer. In some examples the portion of the second wrap layer which extends axially beyond the first wrap layer may be referred to or define an anchor portion or anchor winding portion.

The wrap segments, and indeed each of the wrap layers, may include individual wraps or turns of optical fibre which are wrapped at a winding pitch. In this respect the winding pitch may be defined as the angle of an individual wrap with reference to the spool axis. A steep winding pitch may define a larger angle relative to the spool axis, whereas a shallow winding pitch may define a smaller angle relative to the spool axis. A steeper winding pitch may provide more individual turns or wraps of the fibre per unit axial spool length, whereas a shallower winding pitch may provide a lower number of individual turns or wraps per unit axial spool length. A winding pitch which provides adjacent fibre turns or wraps in engagement with each other may be defined as a closed winding pitch. Adjacent fibres which are axially separated may define an open winding pitch.

In some examples a transition of the optical fibre from the first wrap layer to the second wrap layer in one or more, for example each, wrap segment may be provided with a substantially constant winding pitch, albeit with a winding direction change.

A transition of the optical fibre from the first wrap layer to the second wrap layer in one or more, for example each, wrap segment may be provided with a change in winding pitch. In one example the winding pitch may become shallower once transitioned into the second wrap layer. Such an arrangement may provide the second wrap layer with fewer turns or wraps of the fibre. During despooling, this may cause the second wrap layer to be depleted faster than the first wrap layer, at least with the same rate of fibre deployment. This may provide benefits where the second wrap layer exhibits a reduced self-support capability of individual turns or wraps, in that residence time of depleting from the second wrap layer is minimised.

In some examples the transition of the optical fibre from the first wrap layer into the second wrap layer may be provided with a significant change, for example reduction, in winding pitch. The transition of the optical fibre from the first wrap layer into the second wrap layer may be provided with a change from a closed winding pitch to an open winding pitch.

In one example the first wrap layer of one or more, for example each, wrap segment may comprise a varying winding pitch. For example, the winding pitch may vary in an axial direction. The first wrap layer of one or more, for example each, wrap segment may comprise a uniform winding pitch. For example, the winding pitch may remain constant throughout the first wrap layer. In some examples the first wrap layer may comprise a closed winding pitch. This may facilitate maximising the length of fibre which is contained within the first wrap layer.

In one example the second wrap layer of one or more, for example each, wrap segment may comprise a uniform winding pitch. For example, the winding pitch may remain constant throughout the second wrap layer.

The second wrap layer of one or more, for example each, wrap segment may comprise a varying winding pitch. For example, the winding pitch may vary in an axial direction.

In one example a first axial portion of the second wrap layer of one or more, for example each, wrap segment may comprise a first winding pitch and a second axial portion of the second wrap layer may comprise a second winding pitch. The first winding pitch may be shallower than the second winding pitch. A transition between the first and second axial portions of the second layers may be defined by a change in winding pitch. In one example the second winding pitch may be a closed winding pitch.

In one example the first axial portion may extend over the axial extent of the underlying first wrap layer, and the second axial portion may extend over the additional axial distance covered by the second wrap layer. In this respect the second axial portion may define an anchor portion or anchor winding portion. The second axial portion may extend over an outer surface of a bobbin.

At least two of the plurality of wrap segments may define a common outer maximum diameter.

The overlapping nature of adjacent wrap segments may result in at least a portion of one or more of the wrap segments defining or comprising a tapered region relative to the spool axis. Such a tapered region may provide advantages in permitting one wrap or turn of optical fibre within a wrap layer providing support or defining an anchor point for an adjacent turn or wrap. This effect may be most prominent in a wrap of a tighter winding of the tapered region providing support to an adjacent wrap of a larger radius winding (i.e., on the upslope side).

In one example the first axial direction of winding of the first layer of each segment may be in an upslope direction of a taper. In this way, as individual wraps or turns of the first layer are wound, every tighter wound wrap or turn may provide an anchor for the subsequent turn or winding on the upslope side. This may not only provide benefits once the spool is completely formed, but also during the winding process of the fibre onto the spool.

The spool may comprise a bobbin upon which the optical fibre is wound. The bobbin may define an axis. The bobbin axis may be aligned with the spool axis. The bobbin axis may define the spool axis.

The bobbin may be temporarily provided as part of the spool, for example provided initially to support the wrap segments during winding thereon. In this respect once the wrap segments are formed, the bobbin may be extracted or removed. Such an arrangement may permit despooling from an interior region of the spool, if required. In this example an outer casing or structure may be provided over the wrap segments. The bobbin may comprise a material or coating, such as a low friction material or coating which may assist removal. At least a portion of the bobbin may define a variable geometry to facilitate removal. At least a portion of the bobbin may be frangible, meltable or the like.

The bobbin may provide a permanent component of the spool. For example, the bobbin may remain in place such that the fibre is despooled from the bobbin.

The bobbin may comprise or define any cross-section. An outer surface of at least part of the bobbin may be curved, for example circular. An outer surface of at least part of the bobbin may be polygonal, regular or irregular. In such an arrangement an outer surface of at least a portion of the bobbin may comprise or define a flat surface.

The bobbin may define a winding surface, upon which winding surface the optical fibre is wound.

At least a portion of the winding surface may be parallel with the bobbin axis. In some examples this may be provided by the bobbin comprising a cylindrical portion. The entire winding surface of the bobbin may be parallel with the bobbin axis. Alternatively, only a portion of the winding surface may be parallel with the bobbin axis.

At least a portion of the winding surface may be tapered relative to the bobbin axis. The taper may be linear. The taper may be curved. The taper may be defined by a conical surface of the bobbin. In some examples the entire winding surface may be tapered. Alternatively, only a portion of the winding surface may be tapered.

The taper of the winding surface may permit at least portions of one or more of the wrap segments to define a taper, which may provide advantages, such as those mentioned above.

One portion of the winding surface of the bobbin may be tapered relative to the bobbin axis, and an adjacent portion of the winding surface may be parallel relative to the bobbin axis. Winding of the optical fibre on to the bobbin may be initiated on the tapered portion. For example, winding of the first wrap layer of an initial wrap segment may be initiated on the tapered portion. This arrangement may initiate a taper of each wrap segment. Furthermore, this arrangement may facilitate self-support within adjacent wraps or turns of the fibre in the first layer.

In one example, winding of the first wrap layer of an initial wrap segment may be initiated at or adjacent a transition region between the tapered and parallel portions of the winding surface.

The first axial direction may be a direction which is in an up-sloping direction of the tapered portion. This may permit each wrap or turn of fibre in the first wrap layer to support an adjacent wrap or turn on the upslope side.

The bobbin may comprise a store region for storing a length of the optical fibre separately from the wrap segments. Such an arrangement may facilitate ease of access to the stored length of the optical fibre.

The store region may facilitate storage of one end region of the optical fibre. The store region may accommodate at least one wrap or turn of the end region of the optical fibre. In one example the store region may accommodate one end region of the optical fibre, before said fibre transitions into forming the wrap segments. In this example the stored end may define an initiating end of the fibre. In some examples providing ease of access to the initiating end region of the optical fibre, with the terminating end being easily accessible following winding of the spool, may facilitate testing of the fibre while on the spool, for example permitting transmission of light from one end and reception at the other, to detect any issues such as fibre breakage and the like.

Providing ease of access to an end of the fibre in the store region may permit said end of the fibre to be available for connection to apparatus, such as a sensor, light source etc.

The store region may be provided adjacent the winding surface of the bobbin. A transition path may be provided to allow the optical fibre to extend from the store region to the winding surface. The transition path may comprise a channel, recess, bore or the like.

The store region may comprise an annular recess.

The bobbin may comprise a pocket for accommodating at least one apparatus or component. The at least one apparatus or component may comprise a temperature sensor, pressure sensor, light source, light receiver, controller and/or the like. The pocket may be provided in an outer surface of the bobbin. The pocket may be provided in an end region of the bobbin, for example aligned on the bobbin axis.

The bobbin may comprise a discharge region to improve discharge of the fibre from the bobbin. The discharge region may be provided on one end of the bobbin, for example adjacent a winding surface of the bobbin. The discharge region may be provided for uses where the fibre is discharged generally parallel with the spool axis. The discharge region may assist to lift the fibre from a surface of the bobbin, such as a winding surface of the bobbin. This may minimise the effect of a helix of the fibre during discharge from radially binding against the bobbin, which may otherwise provide resistance to discharge, increasing the likelihood of fibre breakage. Furthermore, in some examples where a degree of adhesion may be present between the fibre and the bobbin, for example caused by the presence of grease, the discharge region may assist to break this adhesion.

The discharge region may comprise a geometrical feature, such as an upset portion, annular lip, bump or the like.

At least a portion of the optical fibre may comprise or be provided with a coating. The coating may in some examples be considered an additional coating. That is to say that the coating may be provided in addition to any plastic coating, or the like, that may be provided with commercially available bare optical fibre. In that regard, the coating may be considered to be a functional coating, e.g. an additional functional coating for use when winding and/or deploying in a bore, or the like.

The coating may be specifically provided in order to assist retaining the fibre within the spool. The coating may assist with providing a degree of resistance to discharge from an associated device on which the spool is provided, which may be desirable in certain uses of the spool. The coating may provide a degree of protection to the optical fibre, before, during and/or after discharge from the spool. The coating may comprise a solid coating, such as a plastic, braided material, Kevlar, PTFE or the like. In some examples the coating may comprise a fluidic material, such as a viscous material. The coating may comprise a grease, or other similar non-Newtonian fluid, such as a shear thickening fluid, shear thinning fluid or the like. The coating may be considered to be functionally adhesive. The coating may exhibit an NGLI number of between 000 to 6, for example between 0 and 5, such as between 2 and 4, for example 3. In some examples multiple different types of coating may be provided, for example along different axial length portions of the fibre.

The fibre may be coated with a coating, such as a grease coating, by stripping the fibre through a store or bath of the coating during discharge of the fibre. Such a store or bath may form part of a device on which the spool is mounted.

The fibre may be coated with a coating prior to being wound on the spool. The fibre may be coated with a coating during the process of winding the fibre on the spool. For example, the coating may be spray deposited on the fibre during winding.

In one example the coating, such as a grease, may be provided on a bobbin prior to winding the fibre on the bobbin. As such, winding the fibre on the bobbin may cause the fibre to become coated. The arrangement of multiple axially distributed wrap segments may facilitate different coatings to be provided along the length of the fibre, for example by providing a first coating over one axial portion of the bobbin, and providing a second coating over a different axial portion of the bobbin.

The spool may be non-rotatable, such that the spool does not rotate during despooling of the fibre. In this case a launch point of the fibre from the spool may orbit the spool.

At least a portion of the spool may be rotatable. The spool may rotate during despooling of the fibre therefrom. In one example rotation of the spool may facilitate a launch point of the fibre from the spool at a fixed rotational position. In some examples rotation of the spool may facilitate a launch point of the fibre from the spool that orbits the spool, but at a lessor rate than were the spool to be fixed. In other similar words, rotation of the spool may be used to reduce the speed of orbiting of the launch point, e.g. compared to having a fixed spool. In some examples the spool may be driven by a rotary drive. Alternatively, a torque may be applied to the spool by the action of the fibre despooling therefrom. A measurement of rotation of the spool may facilitate the length of fibre despooled being determined.

The spool may comprise multiple spool portions, each comprising a plurality of overlapping wrap segments, in the manner described above. The fibre may extend between adjacent spool portions. The spool portions may be depleted sequentially during despooling of the fibre. The spool portions may be rotatably fixed relative to each other. Alternatively, at least two spool portions may be rotatable relative to each other. In this example, depending on the level of torque applied by the despooling of the fibre, the spool portions may rotate relative to each other. This may provide benefits in terms of minimising resistance to despooling. For example, a despooled portion of a fibre may form a helix around one or more spool portions (for example around an "empty" bobbin). Such a helix may provide a radial tightening around the spool portion. The ability of the spool portion to rotate may allow such radial tightening to manifest in rotation of the spool portion, minimising the resistance which may otherwise develop by the radial tightening of the helix.

The provision of multiple spool portions, for example relatively rotating spool portion, may provide benefits where a relatively long spool is required.

The spool may comprise or be provided in combination with a fibre launch guide, for guiding the fibre upon release, discharge or separation from the spool. The launch guide may permit the fibre to be lifted clear of the spool, minimising drag of the fibre across the spool. The launch guide may traverse along the length of the spool, to follow the axial progression of the launch point off the fibre from the spool. In some examples the launch guide may be provided where a rotatably fixed launch point of the fibre is present. In such an arrangement the spool may be rotatable. In such an example, rotation of the spool may provide a suitable drive force to operate the launch guide, for example to drive the launch guide to move axially relative to the spool. A suitable geared connection may be provided in this regard. Alternatively, the launch guide may orbit the spool.

The spool may be supported within a device, such that the fibre may be deployed from the device. The spool may be mounted within the device such that spool axis is aligned substantially parallel, for example, coaxial, with the axis of the device. In some examples the fibre may be deployed along the axis of the device. The fibre may be deployed along a direction which is laterally off-set from the device.

The spool may be mounted in cantilever form within the device. In this respect the spool may define a fixed or proximal end, and a free or distal end. In one example, an initial wrap segment (i.e., first wrap segment to be formed on the spool) may be provided adjacent the proximal end. Alternatively, the initial wrap segment may be provided towards the distal end.

The spool may be mounted within a cavity within the device. The device may comprise or define a cylindrical cavity. The device may define a fibre outlet. The device may comprise a guide, such as a funnel, to guide the fibre towards the outlet. In some examples the fibre outlet may comprise a store or bath of a coating, such that the fibre may become coated during exiting the device.

The outlet of the device may comprise a resistance arrangement to provide a degree of resistance to exit of the fibre. For example, the outlet of the device may establish interference with the fibre.

The device may be configured to traverse a bore, such that the fibre may become deployed within the bore. The device may traverse the bore by action of gravity, by pumping, by tractoring or the like.

In some examples the bore may be defined within a pipeline, such as a surface or subsurface pipeline.

The device may be configured to traverse a wellbore. In this respect the device may be defined as a downhole device.

The device may comprise one or more centralisers to facilitate appropriate positioning of the device within a bore.

The device may be configured to direct, bias, guide, force or the like the fibre towards a wall of a bore. Such an example may be used to assist in the fibre becoming adhered to the bore wall, for example via a coating material provided on the fibre, via one or more magnets and the like.

An aspect of the present disclosure relates to a method for winding a length of optical fibre to form a spool, the method comprising:
  winding the optical fibre around an axis of the spool to form a plurality of wrap segments arranged axially along the spool axis, wherein adjacent wrap segments partially overlap in the axial direction, each wrap segment being formed by winding a first wrap layer in a first axial direction over a first axial distance, and winding a second wrap layer over the first wrap layer in a reverse second axial direction over a second axial distance greater than the first axial distance, the optical fibre extending continuously from the second wrap layer of one wrap segment to the first wrap layer of an adjacent wrap segment.

Features of the method may be derived from the description provided in accordance with any other aspect.

An aspect of the present disclosure relates to a method for winding a length of optical fibre to form a spool, the method comprising:
  winding the optical fibre around an axis of the spool to form a first wrap segment which includes a first wrap layer wound in a first axial direction over a first axial distance, and a second wrap layer wound over the first wrap layer in a reverse second axial direction over a second axial distance greater than the first axial distance, continuing winding of the optical fibre from the second wrap layer of the first wrap segment to form a second wrap segment which includes a first wrap layer wound in a first axial direction partially over the second wrap layer of the first wrap segment and over a first axial distance, and a second wrap layer wound over the first wrap layer of the second wrap segment in a reverse second axial direction over a second axial distance greater than the first axial distance.

Features of the method may be derived from the description provided in accordance with any other aspect.

An aspect of the present disclosure relates to a spool of optical fibre for mounting in a device such that the optical fibre can be despooled and deployed from the device, the spool comprising:
  a spool axis; and
  a length of optical fibre wound around the spool axis to form a plurality of wrap segments arranged axially along the spool axis such that adjacent wrap segments partially overlap in the axial direction, wherein each wrap segment comprises a plurality of wrap layers wound within the wrap segment one on top of the other.

Features of the spool may be derived from the description provided in accordance with any other aspect.

An aspect of the present disclosure relates to a method for winding a length of optical fibre to form a spool, the method comprising:
  winding the optical fibre around an axis of the spool to form a plurality of wrap segments which axially overlap along the spool axis, wherein each wrap segment comprises a plurality of wrap layers wound within the wrap segment one on top of the other.

Features of the method may be derived from the description provided in accordance with any other aspect.

An aspect of the present disclosure relates to a spool of optical fibre for mounting in a device such that the optical fibre can be despooled and deployed from the device, the spool comprising:
  a spool axis;
  a length of optical fibre wound around the spool axis to form a plurality of wrap segments arranged axially along the spool axis, wherein adjacent wrap segments partially overlap in the axial direction,
  wherein each wrap segment comprises a first wrap layer wound in a first axial direction and a second wrap layer wound over the first wrap layer in a reverse second axial direction, wherein a transition of the optical fibre from the first wrap layer to the second wrap layer is provided with a change in winding pitch.

Features of the spool may be derived from the description provided in accordance with any other aspect.

An aspect of the present disclosure relates to a method for winding a length of optical fibre to form a spool, the method comprising:
  winding the optical fibre around an axis of the spool to form a plurality of wrap segments arranged axially along the spool axis, wherein adjacent wrap segments partially overlap in the axial direction, each wrap segment being formed by winding a first wrap layer in a first axial direction over a first axial distance, and winding a second wrap layer over the first wrap layer in a reverse second axial direction over a second axial distance greater than the first axial distance; and
  providing a change in winding pitch during transition from the first wrap layer to the second wrap layer.

Features of the method may be derived from the description provided in accordance with any other aspect.

An aspect of the present disclosure relates to a bobbin for receiving windings of an optical fibre thereon. The bobbin may be provided in accordance with any description provided above in relation to any other aspect. For example, the bobbin may comprise a winding surface, wherein a first portion of the winding surface is tapered relative to an axis of the bobbin, and a second portion of the winding surface is substantially parallel relative to the axis of the bobbin.

The bobbin may comprise a storage region for storing a length of fibre.

The bobbin may comprise a cavity for accommodating one or more components, such as a controller, light source, sensor, receiver or the like.

An aspect of the present disclosure relates to a device comprising a spool according to any other aspect.

An aspect of the present disclosure relates to a method for deploying a fibre in a bore, the method comprising traversing a device which includes a spool of optical fibre through a bore, and deploying the optical fibre from the device.

The spool and/or device may be provided in accordance with any other aspect.

BRIEF DESCRIPTION OF THE DRAWINGS

These and other aspects of the present disclosure will now be described, by way of example only, with reference to the accompanying Figures, in which:

FIG. 2 is a perspective view of the device of FIG. 1;

FIG. 3 is a part sectional view of the device of FIG. 2, shown in perspective view;

FIG. 4 is a part sectional view of the device, shown in side elevation;

FIGS. 37 and 38 illustrate the spool formed in the sequence of FIGS. 25 to 36 showing discharge of the fibre in opposite directions during despooling of the fibre;

FIGS. 39 to 52 illustrate sequential stages in winding an optical fibre on an alternative bobbin to form a spool;

DETAILED DESCRIPTION OF THE DRAWINGS

Aspects of the present disclosure relate to a spool of optical fibre which may be mounted in a device such that the fibre may be deployed from the device. The device may traverse through a bore, such that the fibre becomes deployed within the bore. The device may be used in many applications or environments. For the purposes of the present description the device is for use within a wellbore, but it should be recognised that this is merely exemplary. It should be understood that the drawings presented are not provided to scale, and may not reflect actual dimensions, ratios, angles, number of features and the like.

Figure 1:
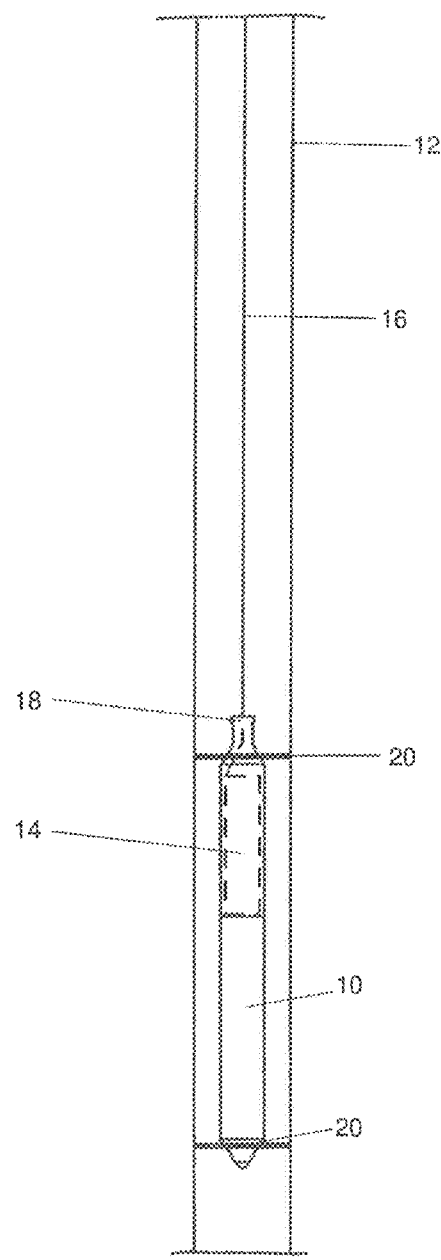
FIG. 1 is a diagrammatic illustration of a device being deployed through a wellbore.

FIG. 1 is a diagrammatic illustration of a device 10 deployed within a wellbore 12. The device 10 includes a spool 14 of optical fibre 16, such that as the device 10 traverses the wellbore 12 the fibre 16 is deployed from an exit 18 at the trailing end of the device 10. The fibre 16 may be used during or after deployment for multiple applications, such as for communication. In some examples the fibre 16 may be used for distributed sensing within the wellbore 12, such as distributed temperate sensing (DTS), distributed pressure sensing (DPS), distributed acoustic sensing (DAS), or the like.

A perspective view of the device 10 is provided in FIG. 2, illustrated in the direction of the exit 18 at the trailing end thereof. The device 10 is generally cylindrical in form, and in the present example includes centralising elements 20 at opposing ends thereof for facilitating centralisation of the device 10 in the wellbore 12 (FIG. 1).

FIGS. 3 and 4 provide alternative perspective views of the device 10, with a cavity region 22 shown in cross-section, wherein the cavity region 22 accommodates the spool of optical fibre. In this respect FIGS. 3 and 4 illustrate a bobbin 24 of the spool, with no fibre wound thereon for clarity purposes. The bobbin 24 is mounted within the cavity 22 in cantilever form such that the bobbin 24 defines a fixed or proximal end 26 and a free or distal end 28, and arranged to be coaxial with the axis 30 of the device 10.

The device 10 includes an internal funnel 32 which functions to guide fibre despooled from the bobbin 24 towards the exit 18. The exit 18 includes a throughbore 34 which is dimensioned to a similar diameter as the fibre, and in some examples the bore 34 may provide a degree of resistance to fibre passing therethrough. This may assist to control the rate of fibre deployment. In some examples a volume of grease or similar material may be provided within the cavity 22, for example within the internal funnel 32. Such grease may become coated on a fibre during deployment from the device 10. The grease may function to provide a degree of resistance to the deployment of the fibre, to permit the fibre to stick to a wall of the wellbore 12, to protect the fibre, to provide lubrication to the fibre and the like.

Figure 5:
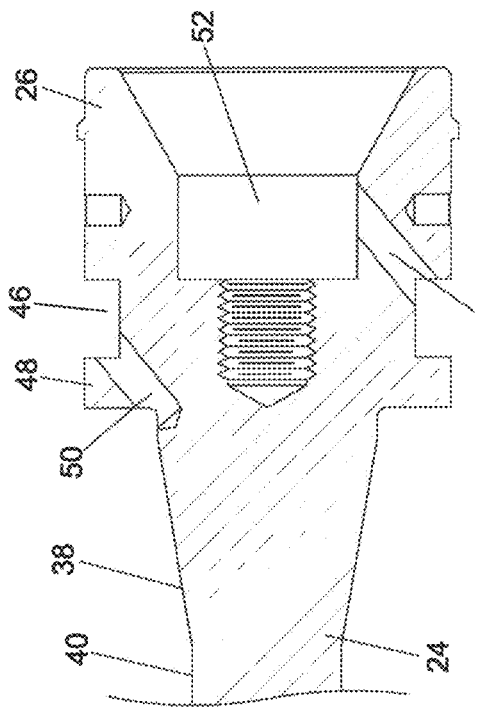
FIG. 5 is a perspective view of a bobbin of the device of FIG. 2.

FIG. 5 provides a perspective view of the bobbin 24 removed from the device 10. The bobbin 24 includes a winding surface 36 which has a conical portion 38 and an adjacent cylindrical portion 40 for receiving fibre thereon, wherein the conical portion 38 is located towards the proximal end 26 of the bobbin 24 and the cylindrical portion 40 is located towards the distal end 28. The conical portion 38 defines a tapered surface relative to the axis 42 of the bobbin 24, whereas the cylindrical portion 40 defines a parallel surface relative to the bobbin axis 42.

The bobbin 24 further comprises an annular lip 44 at the distal end 28. As will be described in more detail below the annular lip 44 assists during despooling of fibre from the bobbin 24.

Figure 6:
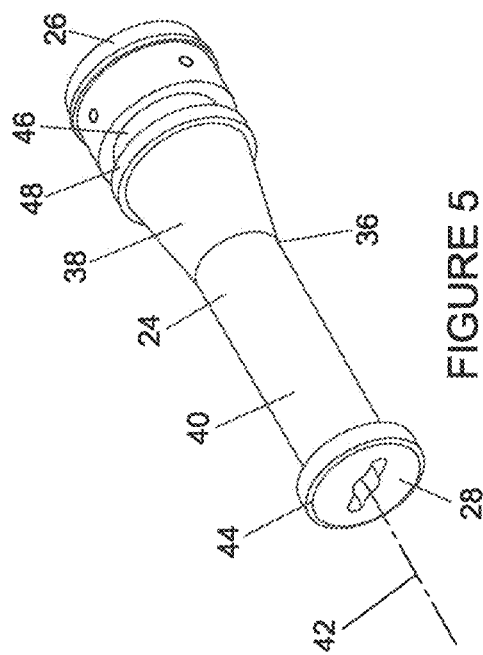
FIG. 6 is a sectional view of an end region of the bobbin of FIG. 5.

The bobbin 24 also includes an annular recess 46 at the proximal end 26, separated from the conical portion 38 by an annular lip 48. The annular recess 46 functions as a storage area to store one or more turns of optical fibre, such that an end of said optical fibre is readily accessible following winding onto the bobbin 24, facilitating any testing operations and the like prior to being installed in the device 10. FIG. 6 is a cross-sectional view of the bobbin 24 in the region of the proximal end 26, illustrating the form of the annular recess 46 and lip 48. A feed-through bore 50 is provided to allow fibre to pass from the recess 46 to the conical portion 38 of the winding surface 36.

In the present example the bobbin 24 includes an internal pocket 52 extending into the proximal end 26, wherein a further feed-through bore 54 is provided to facilitate passage of fibre from the annular recess 46 into the pocket 52. The pocket 52 may accommodate components or apparatus, such as one or more sensors, a light source, a light receiver, a controller, and the like. Fibre wound on the bobbin 24 may be connected to a component within the pocket 52.

Figure 8:
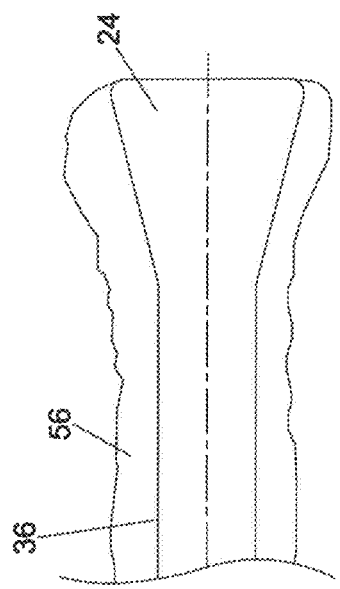
FIGS. 7 to 18 provide sequential stages in winding an optical fibre on the bobbin of FIG. 5 to for a spool.
Figure 7:
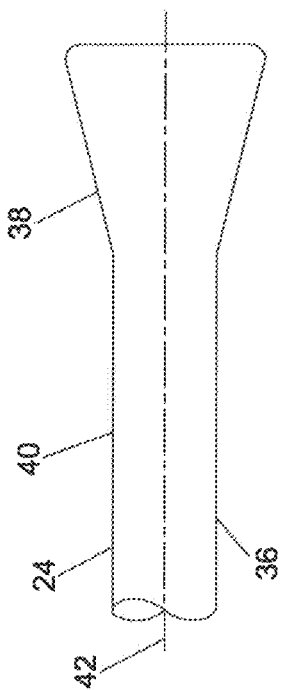

A description of a sequence of winding a length of optical fibre will now be described with reference to FIGS. 7 to 18. Referring initially to FIG. 7, the bobbin 24 is illustrated in simplified form, showing the conical and cylindrical portions 38, 40 of the winding surface 36, and the bobbin axis 42. In FIG. 8 grease 56 is applied over the winding surface 36. Optical fibre wound onto the bobbin 24 will be pulled through the grease 56, such that the optical fibre becomes coated. Such an arrangement may facilitate easier coating of the fibre, rather than, for example, stripping the complete length of the fibre through a grease bath, although such an example alternative or supplemental way of applying grease may still be used. Any suitable grease may be used, or indeed any alternative coating material as required.

Figure 9:
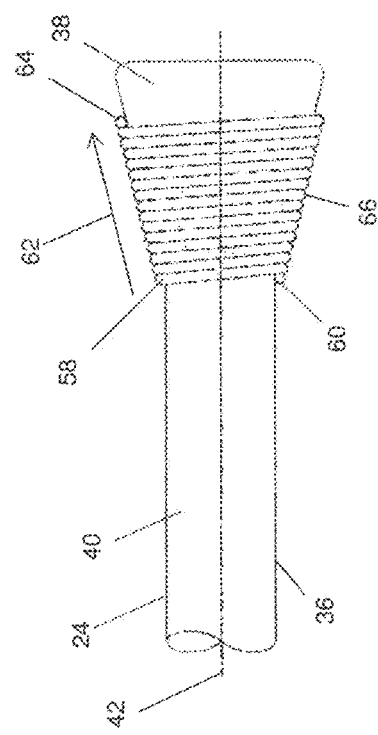

The initial winding stage of an optical fibre 58 is illustrated in FIG. 9, with the grease coating 56 not shown for clarity. Furthermore, with brief reference to FIG. 6, an end region of the fibre 58 may first be extended into the annular recess 46 (not shown in FIG. 9) before winding begins. Fibre extending from the recess 46 may extend along the conical portion 38 of the winding surface, to a winding start point 60 at the interface between the conical portion 38 and cylindrical portion 40 of the winding surface 36.

The fibre 58 is then wound in a first axial direction, indicated by arrow 62, relative to the bobbin axis 42 (which may also define a spool axis) to form a number of adjacent individual turns or wraps, at a steep winding pitch which provides the adjacent wraps in contact with each other (i.e., a closed winding pitch). In the present case the first axial direction is such that the fibre 58 is added to the bobbin 24 in an upslope direction of the conical portion 38, until reaching point 64, thus defining a first wrap layer 66. By winding in an upslope direction each wrap or turn provides support to the subsequent wound wrap or turn of the fibre 58.

Figure 10:
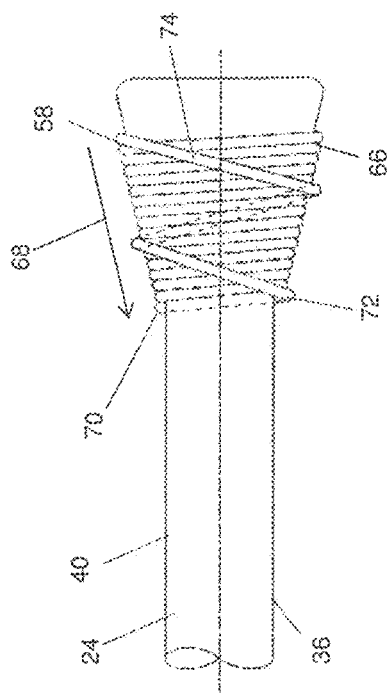
Figure 11:
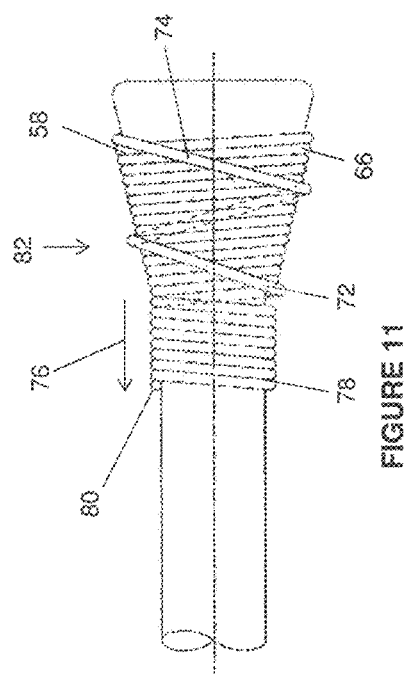

As shown in FIG. 10, the fibre 58 is then wound in a reverse second axial direction, illustrated by arrow 68, over the first wrap layer 66 at a much shallower winding pitch, until reaching point 70 where the fibre 58 is on the cylindrical portion 40 of the winding surface 36, adjacent the starting point of the first wrap layer 66. This may form a first portion 72 of a second wrap layer 74. Following this, as shown in FIG. 11, winding of the fibre 58 is continued further in the second axial direction, illustrated by arrow 76, to form a second portion 78 of the second wrap layer 74, until reaching point 80. The second portion 78 of the second wrap layer 74 is wound at a steeper winding pitch (in this case a closed winding pitch) relative to the first portion 72 of the second wrap layer 74. The second portion 78 may function to provide support to the first wrap layer, and as such in some cases the second portion 78 may be defined as an anchor or anchor winding portion. The first and second wrap layers 66, 74 may form a first wrap segment 82.

Figure 12:
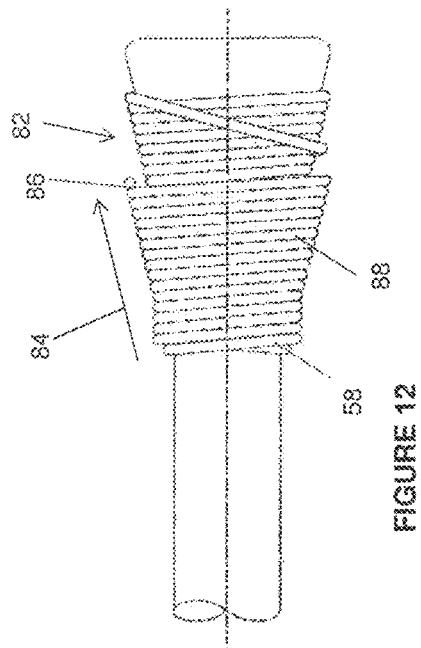
Figure 13:
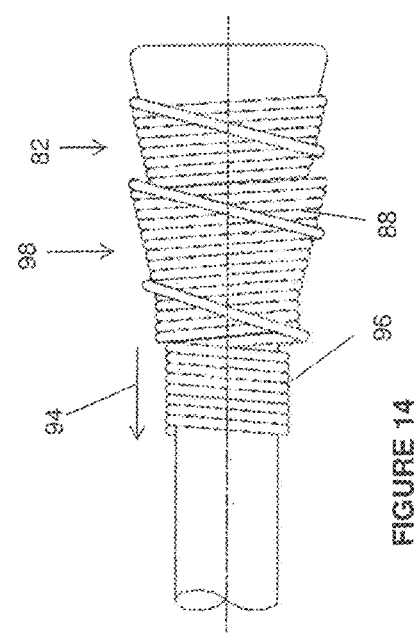
Figure 14:
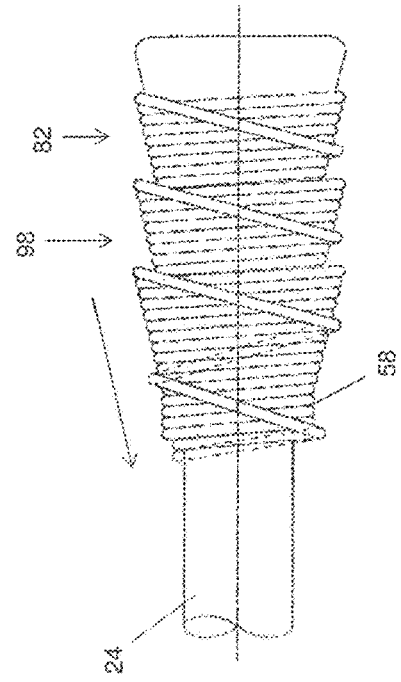
Figure 15:
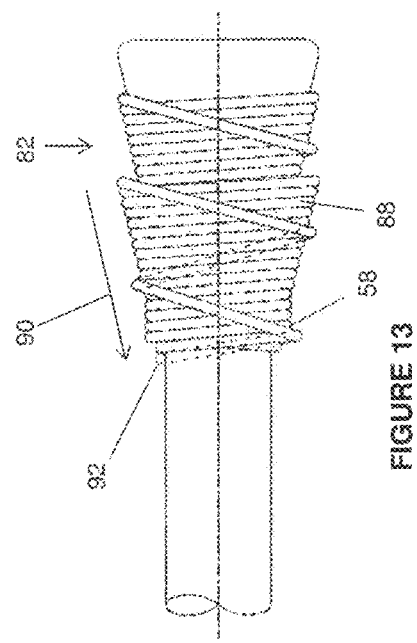
Figure 16:
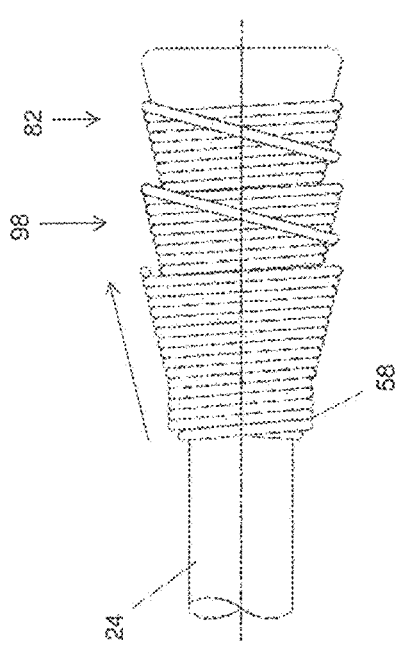
Figure 17:
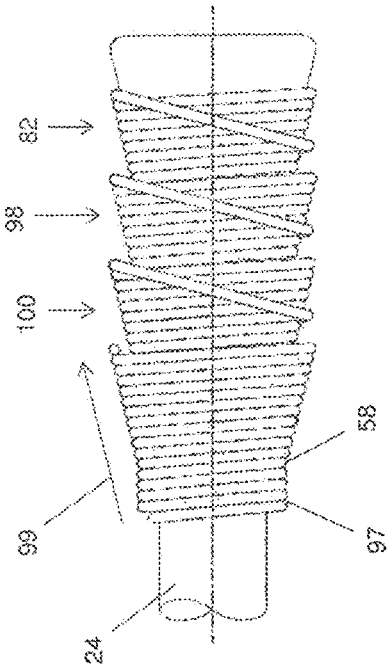

Following this, as illustrated in FIG. 12, the fibre 58 is wound again in the first direction, illustrated by arrow 84, over the first wrap segment 82, at a closed wind pitch until reaching point 86 to form a subsequent first layer 88. Next, as illustrated in FIG. 13, the fibre 58 is wound in the direction of arrow 90, at a shallower winding pitch over the first layer 88 until reaching point 92, with the fibre 58 continuing to be wound in the direction of arrow 94 in FIG. 14 to complete a second wrap layer 96. The newly formed first and second wrap layers 88, 96 define a second wrap segment 98 which axially overlaps the first wrap segment 88, wherein each wrap segment extends to a common outer diameter.

The winding process may be continued in the same manner, as illustrated in FIGS. 15 to 18 to add further axially overlapping wrap segments (e.g., segment 100), each with first and second wrap layers, distributed along the length of the bobbin 24. The winding process may be continued until the required length of fibre 58 has been wound onto the bobbin 24 to form a complete spool. In some examples between 10 to 10,000 meters, and possibly more, of fibre 58 may be wound onto the bobbin 24, perhaps over 2 to 300, and possibly more, axially overlapping wrap segments.

Figure 18:
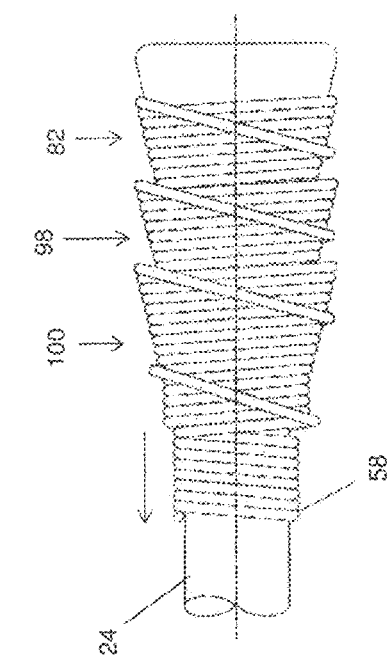

The winding of the fibre 58 may be completed by winding a final wrap layer 97 in the direction of arrow 99 shown in FIG. 18.

The provision of partially overlapping wrap segments may be such that at least a proportion of one wrap segment is supported or constrained by the overlapping adjacent segment. Further, the multiple adjacent and overlapping segments may provide a degree of resistance to being disturbed by any object, such as the despooled portion of the fibre, dragging thereacross. Also, the supporting effect of the overlapping segments may be such that any requirement for end flanges may be minimised or eliminated.

Figure 19:
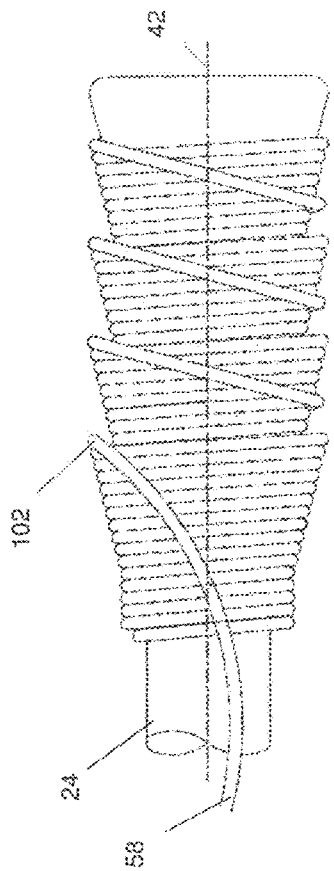
FIGS. 19 and 20 illustrate opposite ends of the formed spool during despooling of the fibre therefrom.

FIG. 19 illustrates the fibre 58 being despooled from the bobbin 24, extending generally in the direction of the axis 42. During despooling the wrap layers of one segment are unwound before being unwound from an adjacent wrap segment, and so on. In this way, during despooling the wrap segments are each sequentially depleted, one after the other, in an axial direction, which may be referenced as the depleting direction, along the spool axis 42. In this respect, during despooling, the axial length of the spool will reduce in the depleting direction.

The axial fleeting movement or traverse made by a launch or release point 102 of the optical fibre 58 during despooling from an individual wrap layer is limited to the axial length of each individual wrap segment, and not, as conventionally known, the entire axial length of the spool, which may otherwise cause complications, such as from the unwound section of fibre effectively dragging across and possibly disturbing the windings still on the spool.

In the present example the bobbin 24 is rotatably fixed within the device 10. In such an arrangement the fibre launch point 102 will orbit the spool during despooling. In alternative examples the bobbin 24 may be rotatably mounted in the device 10. In such an arrangement the action of the fibre 58 despooling may apply a torque to the bobbin 24, thus causing said bobbin 24 to rotate.

Figure 20:
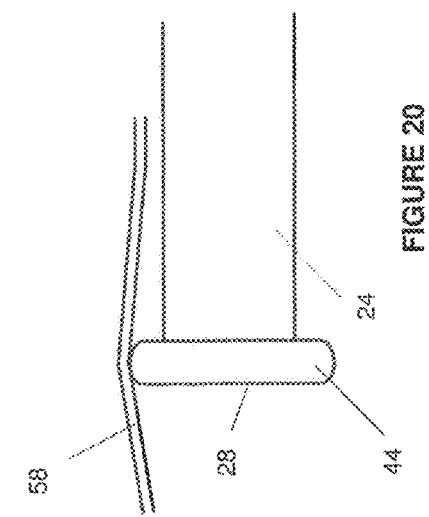

With reference to FIG. 20, the annular lip 44 provided at the distal end 28 of the bobbin 24 functions to lift the fibre 58 from the winding surface of the bobbin 24. This may minimise the effect of a helix of the fibre 58 during discharge from radially binding against the bobbin 24, which may otherwise provide resistance to discharge, increasing the likelihood of fibre breakage. Furthermore, in some examples where a degree of adhesion may be present between the fibre 58 and the bobbin 24, for example caused by the presence of grease, the lifting effect provided by the annular lip 44 may assist to break this adhesion.

Figure 21:
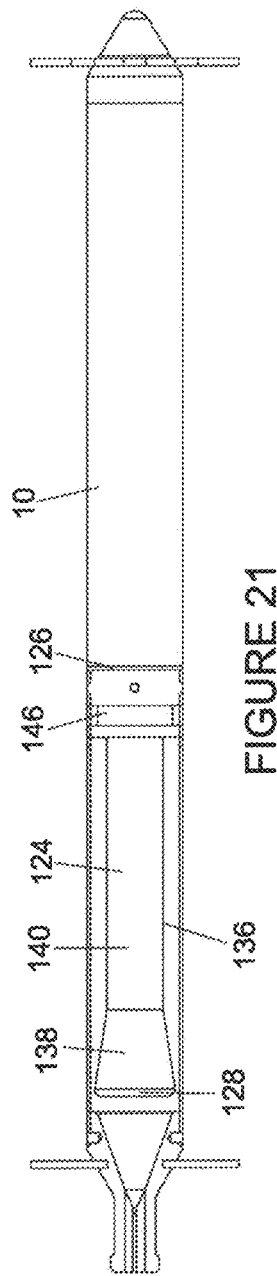
FIG. 21 is a part sectional view of a device with an alternative bobbin form.

Reference is now made to FIG. 21 which illustrates the device 10 with an alternative form of bobbin 124. The bobbin 124 is similar in many respects to the bobbin 24 described above, and as such like features share like reference numerals, incremented by 100. Thus, the bobbin 124 extends from a proximal end 126 to a distal end 128 and includes a winding surface 136 having a conical portion 138 and a cylindrical portion 140. However, in the present example the conical portion 138 is located towards the distal end, and the cylindrical portion 140 is located towards the proximal end.

Figure 22:
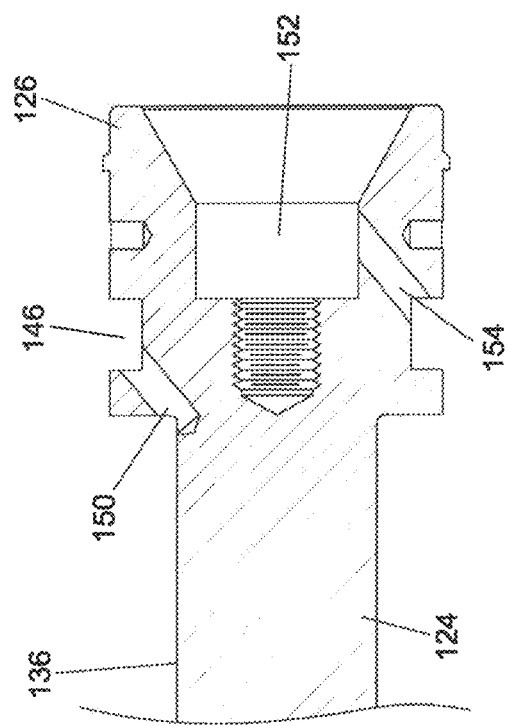
FIG. 22 is a sectional view of an end region of the bobbin of FIG. 21.

The proximal end 126 of the bobbin 124 includes an annular recess 146 for storing an end region of fibre when wound on the bobbin 124. As illustrated in FIG. 22, which is a cross-sectional view through the proximal end region of the bobbin 124, a feed-through bore 150 extends between the recess 146 and the winding surface 136 of the bobbin 124, and similarly a feed-through bore 154 extends between the recess 146 and a pocket 152 in the end of the bobbin 124.

Figures 23, 24:
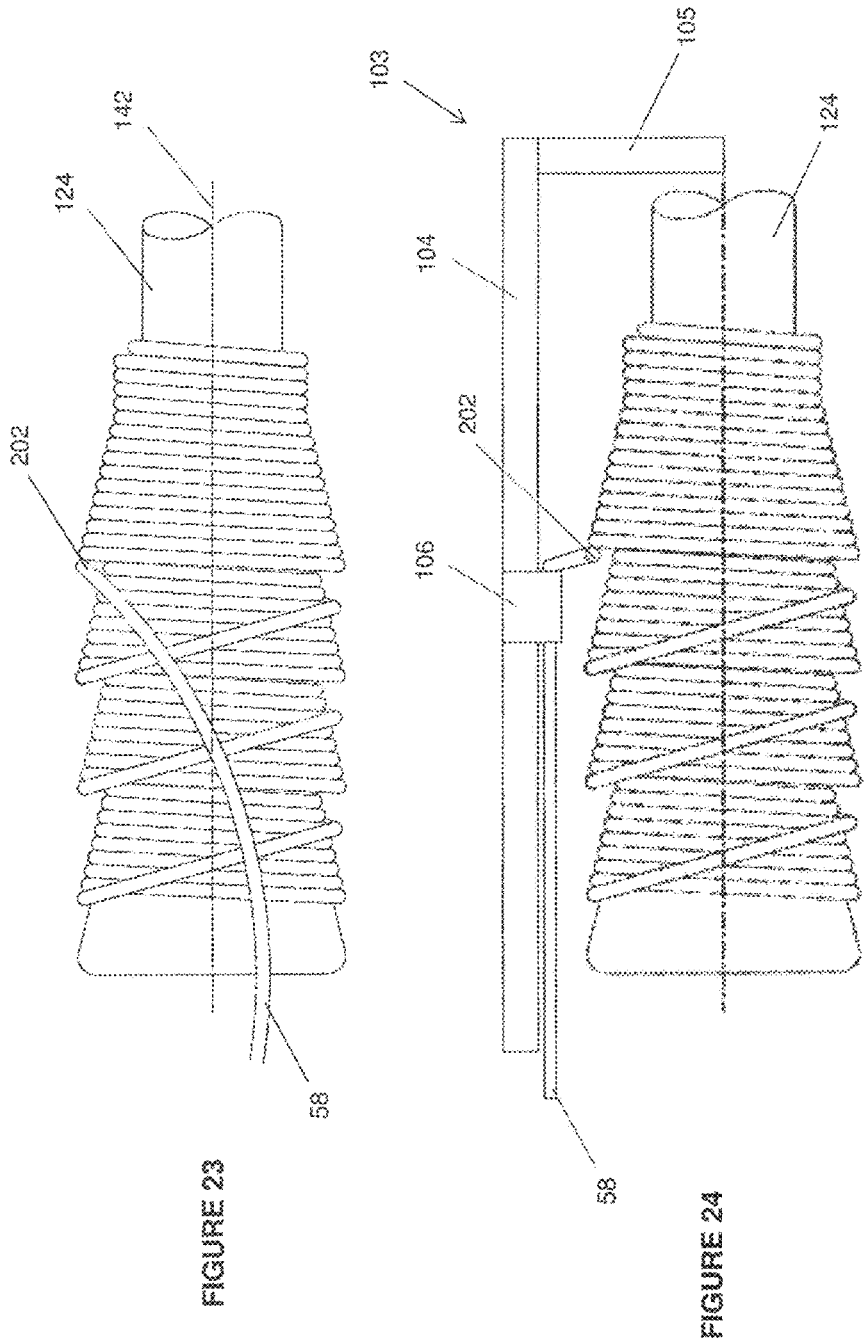
FIG. 23 illustrates a spool of optical fibre, using the bobbin of FIG. 21, shown a discharge direction of the fibre during despooling from the spool.
FIG. 24 illustrates the spool of FIG. 23, with a fibre launch guide.

Fibre may be wound on the bobbin 124 in the same manner described above, with winding initiated again at the interface between the conical and cylindrical portions 138, 140. FIG. 23 illustrates the bobbin 124 loaded with fibre 58, with the fibre 58 being despooled in the direction of the spool axis 142. In this case the fibre 58 passes across the wrap segments. However, the nature of the overlap of the wrap segments provides a robust arrangement which may resist being disturbed by the despooled portion of the fibre.

In FIGS. 21 to 23 the bobbin 124 is rotatably fixed within the device 10, such that a launch point 202 of the fibre 58 orbits the spool. However, in other examples the bobbin 124 may be rotatably mounted within the device 10. FIG. 24 illustrates the bobbin 124 in a rotatable format, such that the fibre launch point 202 is provided at a fixed rotatable location. In the example illustrated a launch guide 103 is provided which includes a lead screw 104 gear coupled to the bobbin 124 via a drive train 105. A carriage 106 is mounted on the lead screw which is engaged with the fibre 58. During rotation of the bobbin 124, the carriage 106 axially traverses along the lead screw 104, lifting the fibre 58 from the outer spool surface. In some examples the rotation of the bobbin 124 may be measured, with the measurement used to determine the length of fibre 58 which has despooled.

In the example shown in FIG. 24, the device 10 is configured such that the carriage 106 remains in advance of the fibre launch point 202, as the fibre 58 is despooled. In other similar words, the carriage 106 may be considered to be displaced in an axial direction, relative to the launch point 202, and in the direction that the fibre is being despooled (as is shown in FIG. 24). This may assist with ease of despooling. Of course, in other examples, the carriage 106 may be retarded relative to the launch point 202, or indeed be positioned around the launch point 202 (e.g. approximately aligned axially with the launch point 202). It will be appreciated also that, depending on the progression of despooling, the carriage 106 may at times be in advance of the launch point 202, while at other times be retarded relative to the launch point 202.

Figure 25:
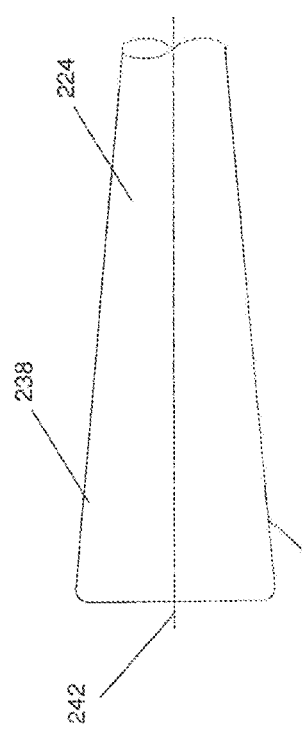

In the examples provided above the bobbin includes a winding surface having both conical and cylindrical portions. However, other forms of bobbin may be provided, an example of which is shown in FIG. 25. The bobbin 224 is in some ways similar to the bobbin 24 first shown in FIG. 3, and as such like features share like reference numerals, incremented by 200. The bobbin 224 includes a winding surface 236 which includes only a conical portion 238 with a tapering surface relative to the bobbin axis 242.

Figure 26:
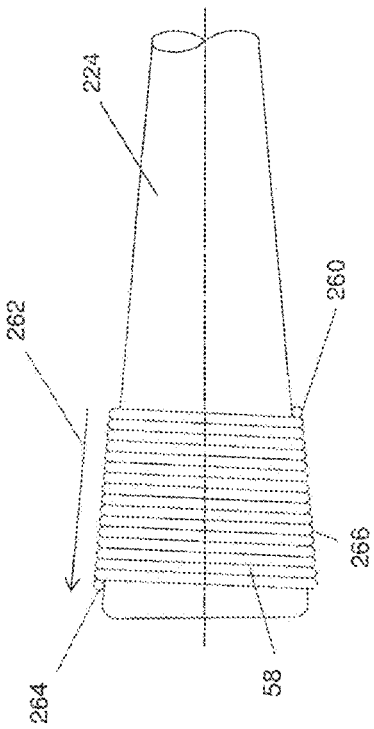
FIGS. 25 to 36 illustrate sequential stages in winding an optical fibre on an alternative bobbin to form a spool.

A sequence of winding fibre 58 on the bobbin 224 is shown in FIGS. 26 to 36. Referring initially to FIG. 26, winding is initiated at point 260, with the fibre 58 being wound in an upslope direction, illustrated by arrow 262, in a closed winding pitch until reaching point 264, thus defining a first wrap layer 266.

Figure 28:
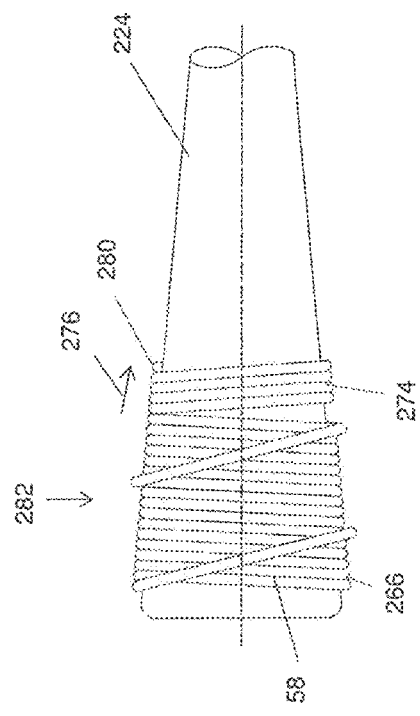
Figure 27:
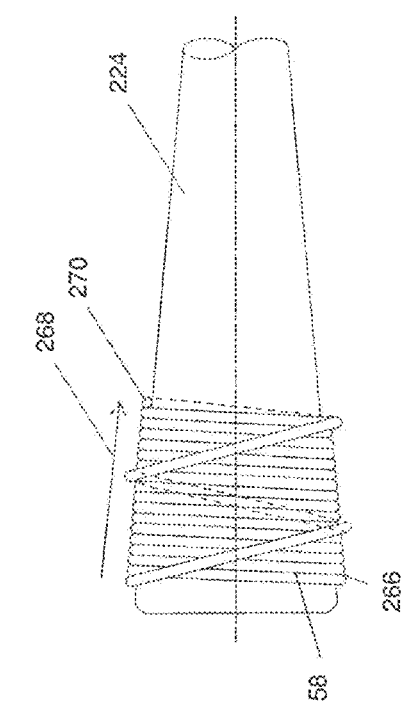
Figure 29:
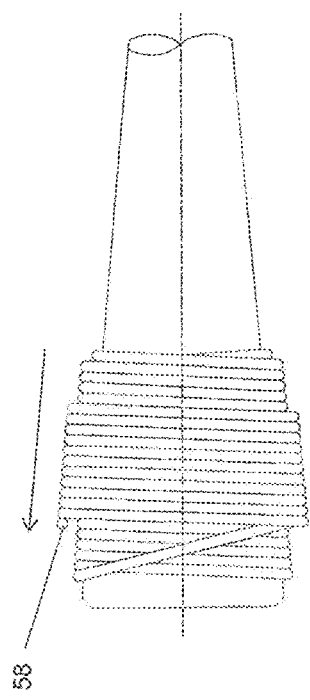
Figure 30:
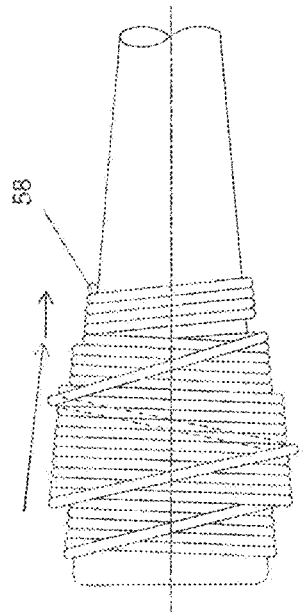
Figure 31:
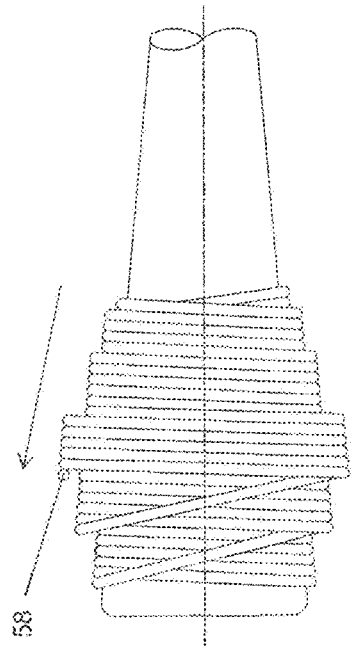
Figure 32:
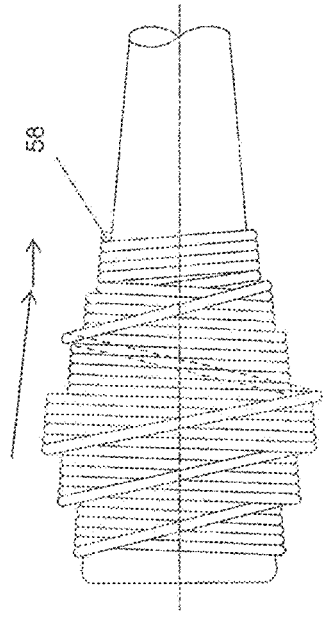
Figure 33:
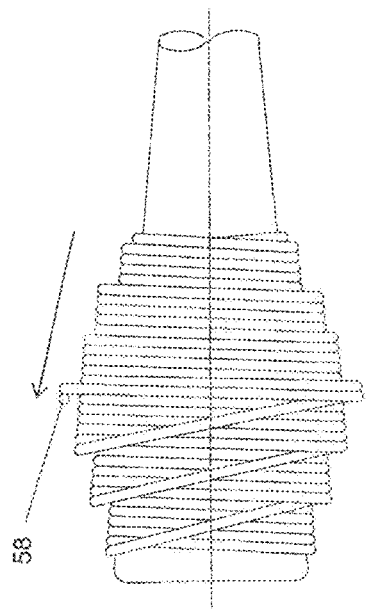
Figure 34:
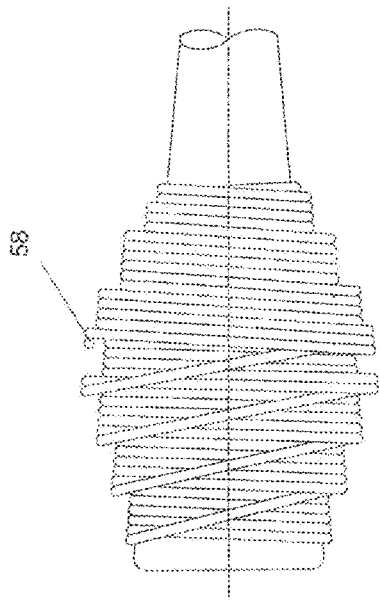
Figure 35:
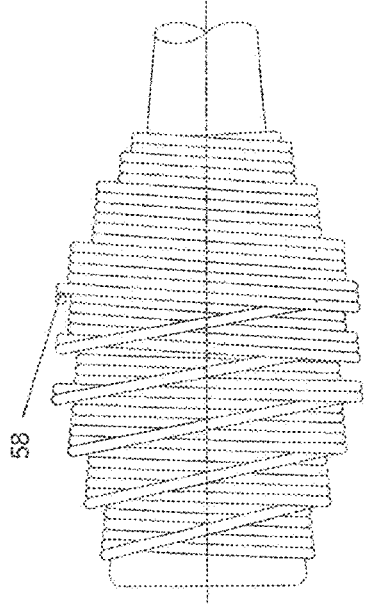
Figure 36:
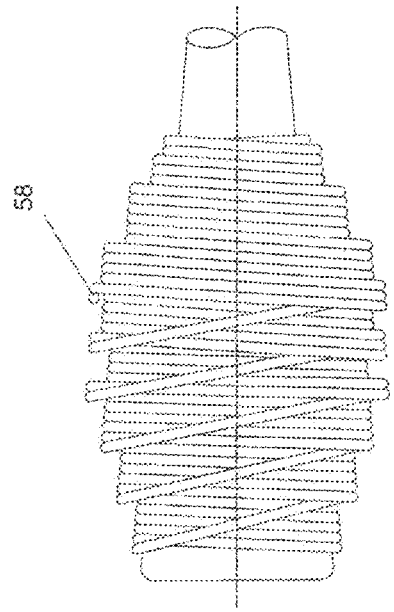

As shown in FIG. 27, the fibre 58 is then wound in a reverse second axial direction, illustrated by arrow 268, over the first wrap layer 266 at a much shallower winding pitch, until reaching point 270, when the fibre 58 continues being wound at a closed winding pitch, as illustrated in FIG. 28, in the direction of arrow 276 to point 280 thus forming a second wrap layer 274 and completing a first wrap segment 282. This sequence is repeated, as illustrated in FIGS. 29 to 36, until the desired length of fibre 58 is wound. In this respect individual wrap segments may eventually begin to extend to a common outer diameter, as shown in FIGS. 34 to 36.

The fibre 58 may be despooled in either axial direction from the bobbin 224, as shown in FIGS. 37 and 38.

An alternative bobbin 324 is illustrated in FIG. 39 and includes a winding surface 336 which includes only a cylindrical portion 340 with its surface parallel to the bobbin axis 342. A sequence of winding fibre 58 on the bobbin 324 is shown in FIGS. 40 to 52. Referring initially to FIG. 40, winding is initiated at point 360 and extends in the direction of arrow 362, in a closed winding pitch until reaching point 364, thus defining a first wrap layer 366.

Figure 52:
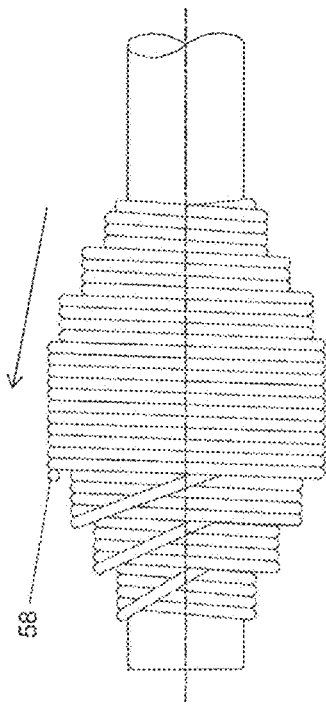
Figure 51:
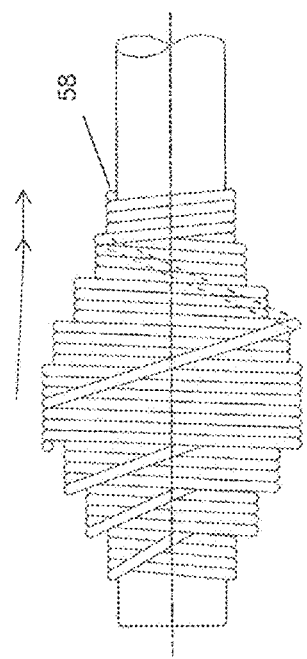

As shown in FIG. 41, the fibre 58 is then wound in a reverse second axial direction, illustrated by arrow 368, over the first wrap layer 366 at a much shallower winding pitch, until reaching point 370, when the fibre 58 continues being wound at a closed winding pitch, as illustrated in FIG. 42, in the direction of arrow 376 to point 380 thus forming a second wrap layer 374 and completing a first wrap segment 382. This sequence is repeated, as illustrated in FIGS. 43 to 52, until the desired length of fibre 58 is wound. It should be noted that FIG. 43 shows the first layer 388 of a second wrap segment being laid down, and FIG. 44 illustrates this first layer 388 in cross section. The individual wrap segments may eventually begin to extend to a common outer diameter, as shown in FIGS. 50 to 52.

Figure 54:
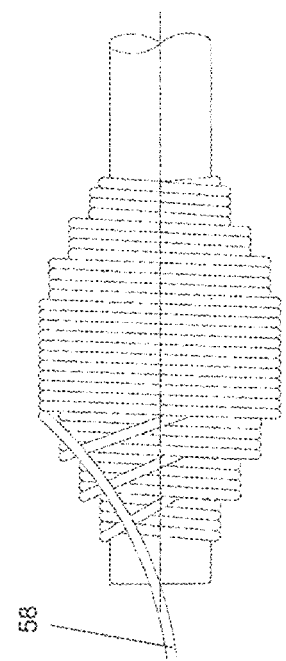
FIGS. 53 and 54 illustrate the spool formed in the sequence of FIGS. 39 to 52 showing discharge of the fibre in opposite directions during despooling of the fibre.
Figure 53:
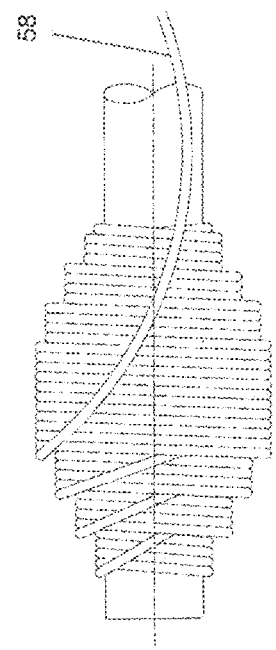

The fibre 58 may be despooled in either axial direction from the bobbin 324, as shown in FIGS. 53 and 54.

Figure 55:
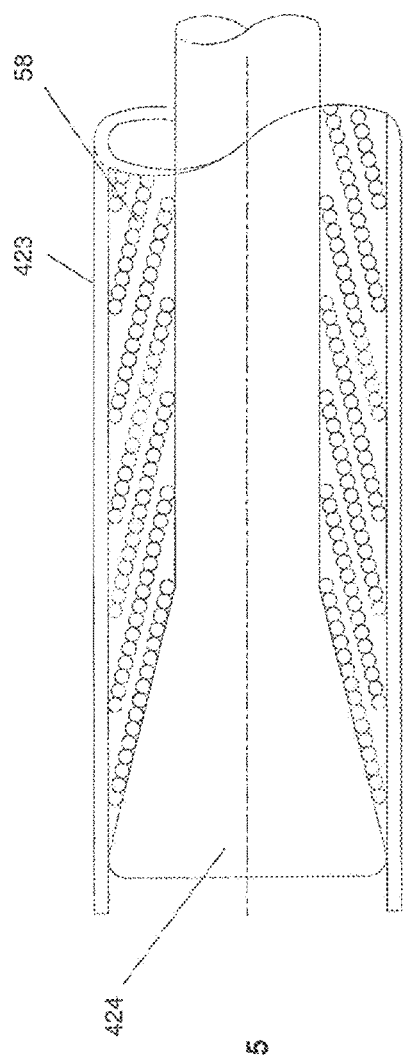
FIGS. 55 and 56 illustrate a sequence of forming an alternative spool of optical fibre.
Figure 56:
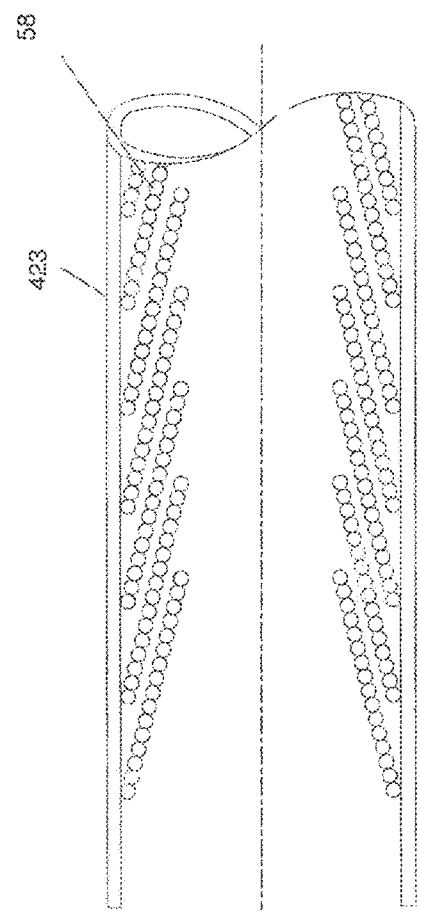
Figure 57:
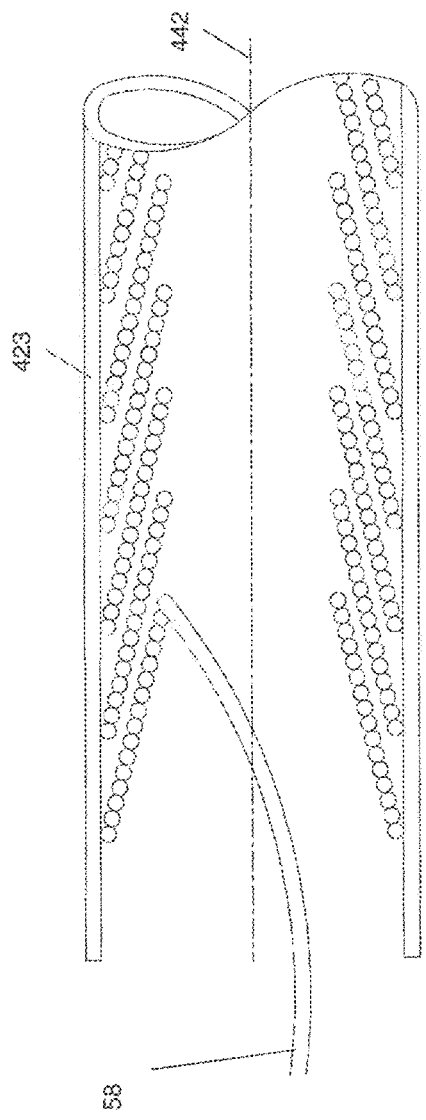
FIGS. 57 and 58 illustrate the spool formed in the sequence of FIGS. 55 and 56 showing discharge of the fibre in opposite directions.
Figure 58:
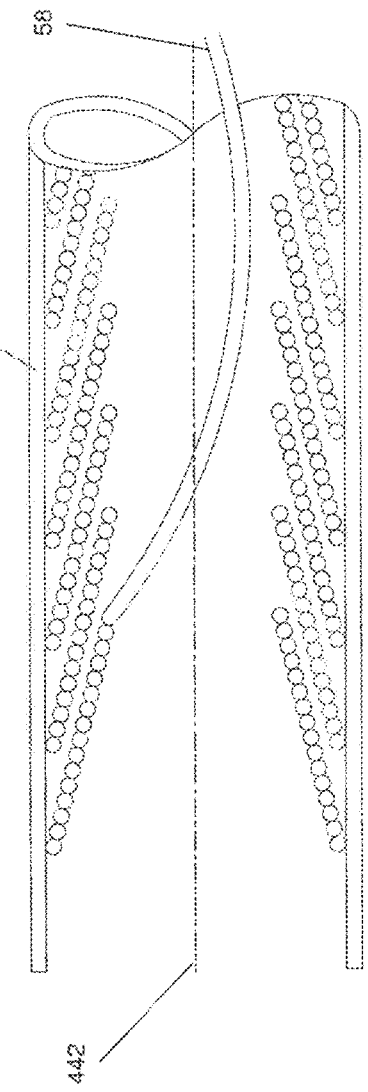

Reference is now made to FIG. 55 which shows a bobbin 424, similar to bobbin 24 first shown in FIG. 3, with fibre 58 wound thereon. A cylindrical housing 423 is provided over the fibre 58. As illustrated in FIG. 56 the bobbin 424 is removed, for example by being extracted, melted, disintegrated or the like, leaving the fibre 58 in place. As illustrated in FIGS. 57 and 58, the fibre 58 may be despooled from an inner diameter of the spool in either direction of the spool axis 442.

Figure 59:
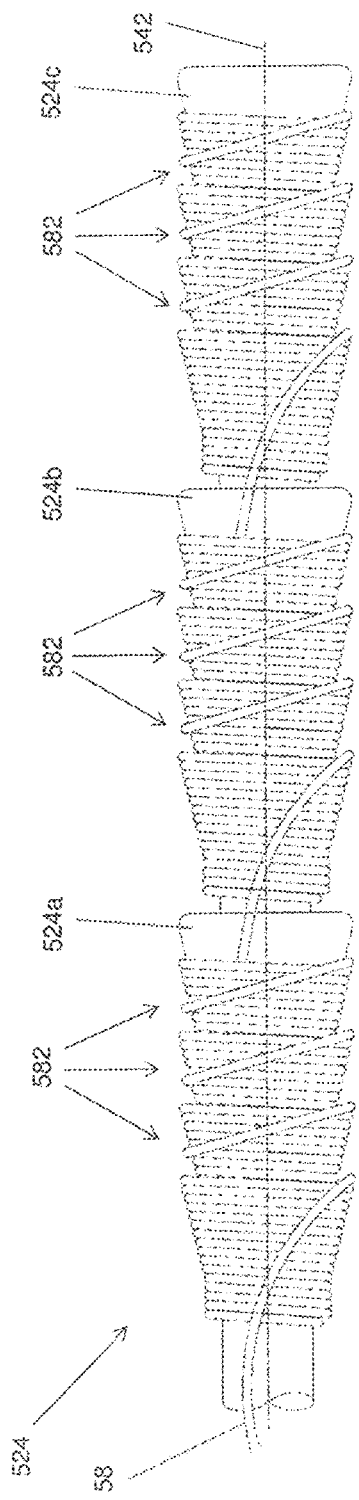
FIG. 59 illustrates an alternative form of a spool of optical fibre.
Figure 60:
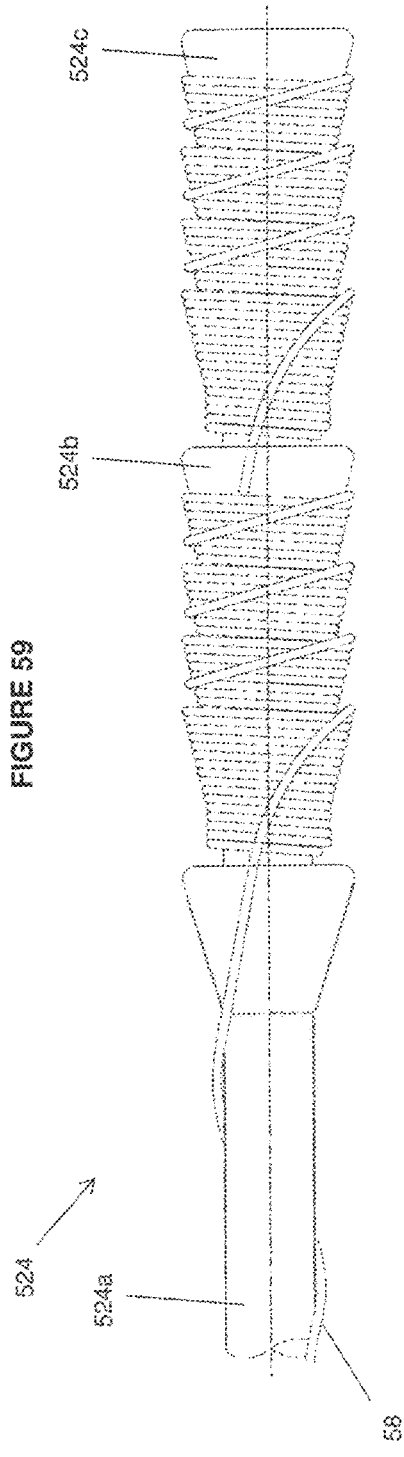
FIG. 60 illustrates the spool of FIG. 59, showing the fibre partially depleted from the spool.

Reference is now made to FIGS. 59 and 60, which shows a further example spool of optical fibre, generally identified by reference 524. The spool 524 includes multiple bobbins 524a-c connected together in end-to-end relation along a common spool axis 542. A continuous length of fibre 58 is wound around each bobbin 524a-c, for example in the same manner described above, such that each bobbin 524a-c includes a plurality of axially overlapping wrap segments 582. In the present example the entire spool 524 may be rotatably mounted within a device, and the individual bobbins 524a-c are rotatably mounted relative to each other.

When the spool 524 is fully loaded, despooling may cause the entire spool 524 to rotate in unison, or indeed the spool 524 may remain static depending on the torque applied during despooling. As the fibre 58 is depleted, for example fully depleted from the first bobbin 524a, the fibre 58 may form a helix around said first bobbin 524a. The ability of the first bobbin 524a to rotate may be such that the helix of fibre may apply a torque sufficient to allow the first bobbin 524 to rotate. However, it will be appreciated that in circumstances in which some or all of the bobbins 524a-c are configured to rotate, it may be the case that after a bobbin has been depleted (e.g. 524a), then that depleted bobbin may rotate less so than the rotation experienced by a despooling bobbin. At some point, during despooling of the fibre 58 from the device 10, a particular depleted bobbin may indeed stop rotating (e.g. as fibre 58 passing thereacross the depleted bobbin may not cause sufficient torque to cause the bobbin to rotate). In some cases, a depleted bobbin may stop rotating, or reduce the rate of rotation, even though the following depleting bobbin continues to rotate (and potentially rotates in synchrony with some or all of the "yet to be despooled" bobbins).

Figure 61:
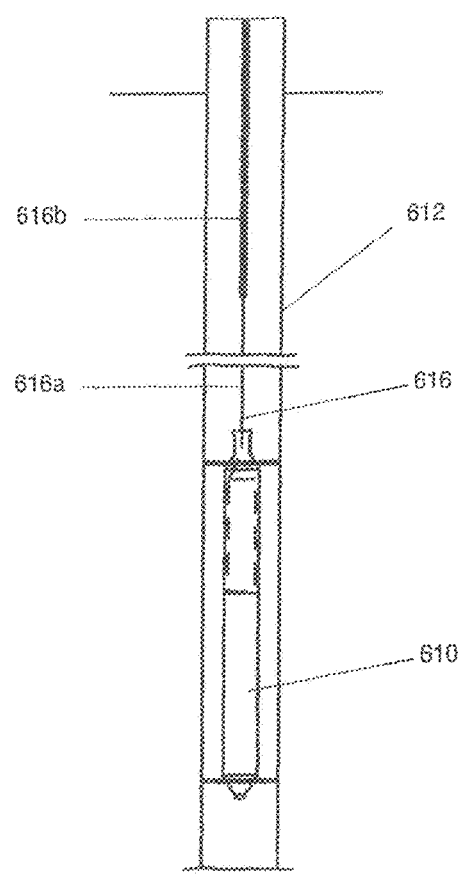
FIG. 61 illustrates a device which includes a spool of optical fibre, with said fibre deployed from the device in a wellbore, wherein the fibre includes different properties in different axial sections.

Reference is now made to FIG. 61 which diagrammatically illustrates a device 610 traversing a wellbore 612 while deploying a fibre 616 therefrom such that the fibre 616 is installed in the wellbore 612. In some examples the fibre 616 may define separate axial portions 616a, 616b which comprise or exhibit different properties. In some examples a different fibre type may be provided in each portion 616a, 616b. Alternatively, a different coating may be applied on the different fibre portions 616a, 616b. The different properties applied along the fibre 616 may be provided to accommodate the particular environment in which the fibre 616 is deployed. For example, additional protection to the fibre 616 may be preferred in an upper region (portion 616b) of the fibre, etc.

Figure 62:
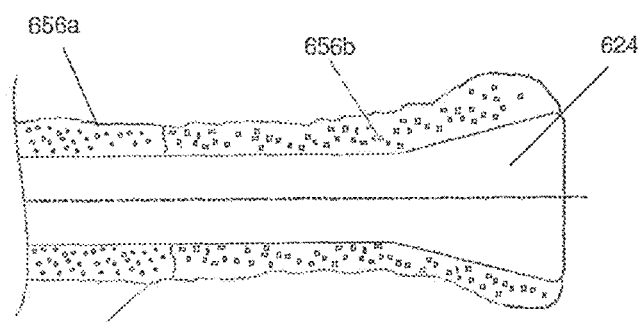
FIG. 62 illustrates a bobbin used to form the spool for including in the device of FIG. 61.

The nature of a fibre winding arrangement as described herein may facilitate an efficient manner of applying a different coating between the different axial portions of the fibre 616. For example, FIG. 62 diagrammatically illustrates a portion of a bobbin 624 which is similar to bobbin 24 first shown in FIG. 3. In this example, before any fibre is wound thereon, a material, such as grease 656 is applied on the outer surface of the bobbin 624, in the same manner shown in FIG. 8. However, in this case a first type of grease 656a is provided over a first axial length of the bobbin 624, and a second type of grease 656b is provided over a second axial length of the bobbin. The different types of grease may be differentiated by viscosity, NGLI number or the like. In this way, as fibre is wound onto the bobbin, different axial portions will become coated with the different types of grease 656a, 656b.

It should be understood that the examples provided are merely exemplary of the present disclosure, and that various modifications may be made thereto.

The invention claimed is:

1. A spool of optical fibre for mounting in a device such that the optical fibre can be despooled and deployed from the device, the spool comprising:
   a spool axis;
   a length of optical fibre wound around the spool axis to form a plurality of wrap segments arranged axially along the spool axis, wherein adjacent wrap segments partially overlap in the axial direction,
   wherein each wrap segment comprises a first wrap layer wound in a first axial direction over a first axial distance, and a second wrap layer wound over the first wrap layer in a reverse second axial direction over a second axial distance greater than the first axial distance, the optical fibre extending from the second wrap layer of one wrap segment to the first wrap layer of an adjacent wrap segment, and wherein the second wrap layer of the one or more wrap segments comprises a varying pitch.

2. The spool according to claim 1, wherein during despooling the wrap segments are each sequentially depleted, one after the other, in a depleting direction axially along the spool axis such that the axial length of the spool reduces in the depleting direction.

3. The spool according to claim 1, wherein the additional axial distance covered by the second wrap layer in each wrap segment provides an axial spacing of the adjacent wrap segment.

4. The spool according to claim 1, wherein a portion of the second wrap layer which extends axially beyond the first wrap layer provides support to the first wrap layer.

5. The spool according to claim 1, wherein at least one of the winding pitch becomes shallower once transitioned into the second wrap layer, and the transition of the optical fibre from the first wrap layer into the second wrap layer is provided with a change from a closed winding pitch to an open winding pitch.

6. The spool according to claim 1, wherein a first axial portion of the second wrap layer of one or more wrap segments comprises a first winding pitch and a second axial portion of the second wrap layer comprises a second winding pitch.

7. The spool according to claim 6, wherein at least one of the first winding pitch is shallower than the second winding pitch, and the first winding pitch is an open winding pitch and the second winding pitch is a closed winding pitch.

8. The spool according to claim 6, wherein the first axial portion extends over the axial extent of the underlying first wrap layer, and the second axial portion extends over the additional axial distance covered by the second wrap layer.

9. The spool according to claim 1, wherein at least two of the plurality of wrap segments define a common outer maximum diameter.

10. The spool according to claim 1, wherein at least a portion of one or more of the wrap segments defines a tapered region relative to the spool axis.

11. The spool according to claim 10, wherein the first axial direction of winding of the first layer of each wrap segment is in an upslope direction of a taper.

12. The spool according to claim 1, comprising a bobbin upon which the optical fibre is wound, wherein the bobbin defines a bobbin axis and a winding surface upon which winding surface the optical fibre is wound.

13. The spool according to claim 12, wherein at least a portion of the winding surface is at least one of parallel with the bobbin axis and tapered relative to the bobbin axis.

14. The spool according to claim 12, wherein one portion of the winding surface of the bobbin is tapered relative to the bobbin axis, and an adjacent portion of the winding surface is parallel relative to the bobbin axis.

15. The spool according to claim 14, wherein winding of the optical fibre on to the bobbin is initiated on the tapered portion.

16. The spool according to claim 14, wherein the first axial direction is a direction which is in an up-sloping direction of the tapered portion.

17. The spool according to claim 12, wherein the bobbin comprises a store region for storing a length of the optical fibre separately from the wrap segments, and the store region at least one of accommodates one end region of the optical fibre and is provided adjacent the winding surface of the bobbin.

18. The spool according to claim 12, wherein the bobbin comprises a discharge region to improve discharge of the fibre from the bobbin.

19. The spool according to claim 18, wherein the discharge region comprises an annular lip.

20. The spool according to claim 1, wherein at least a portion of the optical fibre comprises a coating.

21. The spool according to claim 1, wherein the spool is non-rotatable.

22. The spool according to claim 1, wherein at least a portion of the spool is rotatable.

23. The spool according to claim 22, wherein the spool is driven by a torque applied to the spool by the action of the fibre despooling therefrom.

24. The spool according to claim 1, comprising multiple spool portions, each comprising a plurality of overlapping wrap segments.

25. The spool according to claim 24, wherein the spool portions are rotatable relative to each other.

26. A method for winding a length of optical fibre to form a spool, the method comprising:
winding the optical fibre around an axis of the spool to form a plurality of wrap segments arranged axially along the spool axis, wherein adjacent wrap segments partially overlap in the axial direction, each wrap segment being formed by winding a first wrap layer in a first axial direction over a first axial distance, and winding a second wrap layer over the first wrap layer in a reverse second axial direction over a second axial distance greater than the first axial distance, wherein at least one of
the optical fibre extends continuously from the second wrap layer of one wrap segment to the first wrap layer of an adjacent wrap segment, and
the method further comprises providing a change in winding pitch during transition from the first wrap layer to the second wrap layer.

27. A spool of optical fibre for mounting in a device such that the optical fibre can be despooled and deployed from the device, the spool comprising:
a spool axis;
a length of optical fibre wound around the spool axis to form a plurality of wrap segments arranged axially along the spool axis, wherein adjacent wrap segments partially overlap in the axial direction,
wherein each wrap segment comprises a first wrap layer wound in a first axial direction over a first axial distance and a second wrap layer wound over the first wrap layer in a reverse second axial direction over a second axial distance greater than the first axial distance, wherein a transition of the optical fibre from the first wrap layer to the second wrap layer is provided with a change in winding pitch.

* * * * *